United States Patent
Yap

(10) Patent No.: US 7,543,544 B2
(45) Date of Patent: Jun. 9, 2009

(54) METHODS AND APPARATUS FOR AERODYNAMIC AND HYDRODYNAMIC DRAG REDUCTION AND ATTITUDE CONTROL FOR HIGH SPEED BOATS

(75) Inventor: Loo T. Yap, Ft. Myers, FL (US)

(73) Assignee: Flow Works Inc., Bristol, RI (US)

( * ) Notice: Subject to any disclaimer, the term of this patent is extended or adjusted under 35 U.S.C. 154(b) by 0 days.

(21) Appl. No.: 11/899,543

(22) Filed: Sep. 5, 2007

(65) Prior Publication Data

US 2009/0056612 A1    Mar. 5, 2009

(51) Int. Cl.
    *B63B 1/16*    (2006.01)
(52) U.S. Cl. .................. 114/273; 114/288; 114/289
(58) Field of Classification Search .......... 114/272, 114/273, 284, 288, 289, 291; 244/91
    See application file for complete search history.

(56) References Cited

U.S. PATENT DOCUMENTS

| 978,311 | A |  | 12/1910 | Lake |
| 1,015,568 | A |  | 1/1912 | Langille |
| 1,889,927 | A |  | 12/1932 | MacCallum |
| 2,564,587 | A | * | 8/1951 | Sundstedt ............ 114/288 |
| 3,221,831 | A | * | 12/1965 | Weiland ............ 114/67 R |
| 3,648,640 | A |  | 3/1972 | Granger |
| 4,231,314 | A |  | 11/1980 | Peters |
| 4,237,810 | A |  | 12/1980 | Westfall |
| 4,284,027 | A |  | 8/1981 | Montez |
| 4,365,578 | A | * | 12/1982 | Schellhaas ............ 114/272 |
| 4,827,862 | A |  | 5/1989 | Enriquez |
| 4,926,778 | A |  | 5/1990 | Johnston |
| 4,940,433 | A |  | 7/1990 | Raber |
| 5,111,766 | A |  | 5/1992 | Ortemond |
| 5,402,743 | A |  | 4/1995 | Holderman |
| 5,452,676 | A |  | 9/1995 | Fiore |
| 5,456,202 | A |  | 10/1995 | Schoell |
| 5,458,078 | A |  | 10/1995 | Perette |
| 5,685,253 | A |  | 11/1997 | Alexander, Jr. |
| 6,666,160 | B1 |  | 12/2003 | Örneblad |
| 7,318,388 | B2 | * | 1/2008 | Scism et al. ............ 114/273 |
| 2005/0247251 | A1 |  | 11/2005 | Scism et al. |

* cited by examiner

*Primary Examiner*—Lars A Olson
(74) *Attorney, Agent, or Firm*—Lipsitz & McAllister, LLC

(57) ABSTRACT

The present invention provides methods and apparatus for reducing sinkage and wetted surface, and thus hydrodynamic drag of a high-speed boat through the generation of aerodynamic lift while decreasing overall aerodynamic drag. At least one lift-generating front wing proximate a bow section of the boat with at least one corresponding front air channel may be provided. At least one lift-generating rear wing proximate a transom section of the boat with at least one corresponding rear air channel may also be provided. At least one of the wings may be adjustable to generate aerodynamic lift with one of: (1) a neutral; (2) a transom-lifting; and (3) a bow-lifting pitching moment about a center of inertia of the boat. At least one wing proximate the leading edge of the tunnel of a multi-hull boat may be provided to increase the operational envelope.

30 Claims, 21 Drawing Sheets

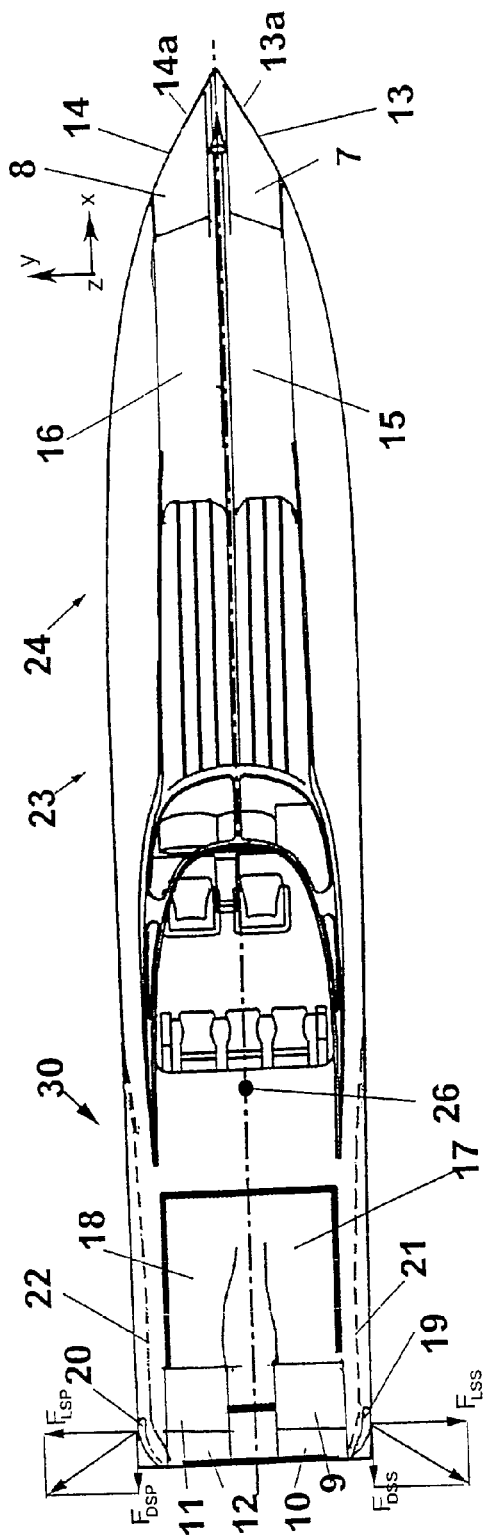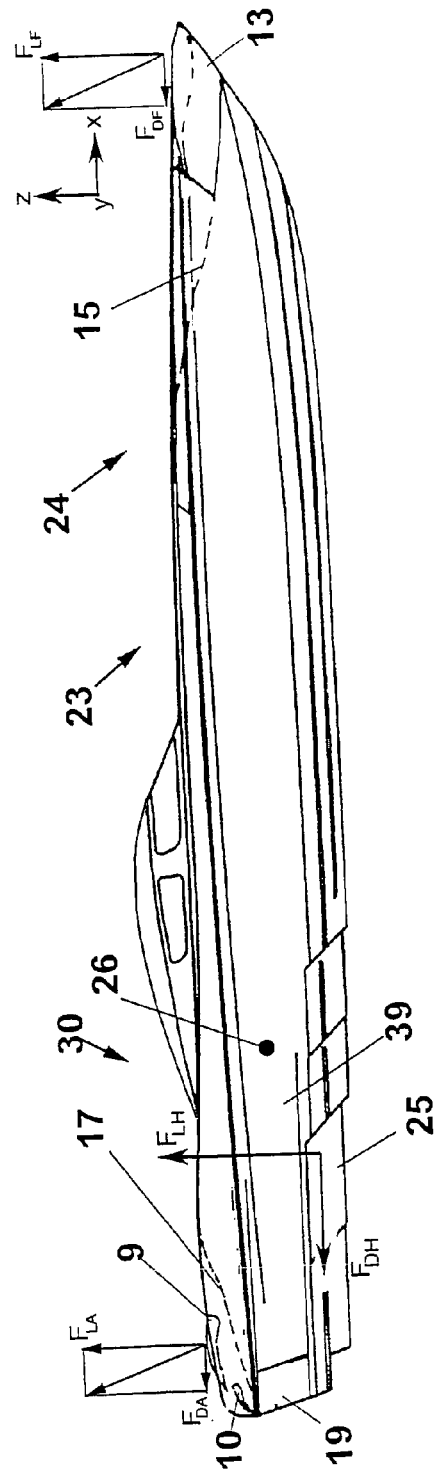
FIG.2A
FIG.2B

METHODS AND APPARATUS FOR AERODYNAMIC AND HYDRODYNAMIC DRAG REDUCTION AND ATTITUDE CONTROL FOR HIGH SPEED BOATS

FIELD OF THE INVENTION

The present invention relates generally to the field of high-speed boats. In particular, the present invention provides methods and apparatus for reducing hydrodynamic and aerodynamic drag in addition to extending the operational envelope of high-speed boats by controlling the attitude, yaw, and rolling of high-speed boats using multiple wings.

BACKGROUND OF THE INVENTION

The performance of a high-speed vessel is intimately linked to the orientation of the hull at speed. Planing hulls mostly rise and change trim angle in response to the hydrodynamic pressure field generated by the hydrodynamic flow. Conversely, the hydrodynamic pressure field acting on the wetted part of the hull is affected by the design of the hull form (See, e.g., U.S. Pat. Nos. 5,452,676; 5,456,202; 5,685,253; and 5,685,253). Generally, the major contributors to drag for a high-speed boat are due to the hydrodynamic pressure field (hydrodynamic pressure drag) and the hydrodynamic velocity boundary layer (hydrodynamic skin friction), in addition to the wave energy imparted.

A boat of length L traveling at a steady speed U at or near a free surface under gravity g tends to make large waves if and only if the Froude number $F=U/\sqrt{gL}$ takes values of the order of 0.55. At this particular value, the boat length is about half of the transverse wavelength $2\pi U^2/g$, and (roughly) equal and opposite waves from bow and stern add together. In this speed regime, wavemaking dominates all other physical processes. Most conventional marine vessels travel much slower (typically F<0.35) to avoid the energy-devouring wave generation phenomenon. In this slow regime, viscous effects dominate.

Although high-speed vessels must still have enough power to accelerate through the large-wavemaking regime ("hump speed"), at their higher design speeds (typically 0.7<F<1.3) less wavemaking is involved. While aerodynamic lift through the use of wings was applied to boats as early as 1910, (U.S. Pat. No. 978,311), Froude numbers did not exceed values on the order of 0.5. Even recent examples using aerodynamic lift to reduce drag such as ski boats (U.S. Pat. No. 4,284,027) would reach Froude numbers not exceeding values on the order of 1.5.

In prior art mono (v) type hulls, hydrodynamic-drag-reducing aerodynamic-lift has been generated solely at the expense of aerodynamic drag (U.S. Pat. Nos. 978,311; 1,015,568; 1,889,927; 3,648,640; 4,237,810; 4,284,027; 4,827,862; 5,111,766; and U.S. patent application no. 2005/0247251). In these examples, aerodynamic-lift devices at these lower velocities, if properly designed, reduced hydrodynamic pressure drag (due to a lower apparent hull weight) and lowered hydrodynamic friction drag (due to reduced wetted area) to some degree. The lower velocities kept the unavoidably induced aerodynamic drag somewhat in check in comparison with the hydrodynamic gains in drag reduction. Beside the fact that all prior art only pertains to Froude numbers less than values on the order of 1.5, the aerodynamic lifting forces in the prior art are estimated to constitute only a small fraction (10% or less) of the total weight of the vessel.

For multi-hull boats such as catamarans and tri-hulls operating at high velocities, the air compacted in the contracting tunnel or tunnels running along part or virtually the entire length of the hull produces upward lift (see, for example, U.S. Pat. Nos. 5,402,743; 5,458,078; and U.S. patent application no. 2005/0247251). This lift, as in many cases of high-power multi-hulls, determines the speed limitations of the craft. Beyond these limits, multi-hulls can lift off the water completely which results in dangerous loss of control. The amount of air captured by the inlet of the tunnel as well as the degree of air compaction has been entirely dependent upon the size of the tunnel, the degree of contraction, and the attitude of the boat during operation. The attitude (position and orientation of the boat with respect to the water's surface) of the boat is dependant upon many complex factors which, with the teachings of the present invention, can be controlled through the forward and aft lift-generating wings. For example, by using the forward wing or wings as the leading edge of the tunnel in accordance with one example embodiment of the present invention, not only can forward lift be controlled by adjusting the position and attitude of the wing but also can the amount of air captured by the tunnel be controlled. The synergy of controlling tunnel inlet conditions as well as forward lift achieved by the present invention gives additional control thus far unavailable in the prior art.

In other prior art (U.S. Pat. Nos. 4,926,778 and 4,940,433), forward and aft wings are used to control the pitch of boats. In U.S. Pat. No. 4,926,778, even with currently available high lift-to-drag ratio airfoils, the forward outwardly extending wings would be physically unable to generate sufficient lift to achieve the objectives of the present invention. The base angle of attack of seven degrees set forth in U.S. Pat. No. 4,926,778 is already very near the stalling angles for most airfoils. Hence, any condition such as "bow down" or "transom up" which would require additional lift through an increase of angle of attack actually would result in a lift drop off as a result of boundary-layer separation over the suction side of the airfoil.

In U.S. Pat. No. 4,940,433 and U.S. patent application no. 2005/0247251 a similar control scheme as in U.S. Pat. No. 4,926,778 is put forth albeit with a forward above deck airfoil. Just as in U.S. Pat. Nos. 978,311; 1,015,568; 1,889,927; 3,648,640; 4,237,810; 4,284,027; 4,827,862; and 5,111,766, attitude control is traded off for aerodynamic drag. In other words, the larger the attitude correction required the more aerodynamic drag has to be generated. Although from a safety perspective this may be desirable, from a performance perspective (speed as well as fuel efficiency) it is not. Additionally, the prior art discussed above only addresses the correction of pitch angles.

The terms "very-high-speed boat" and "VHS Boat" describes any surface vessel which is capable of traveling at speeds with Froude numbers ranging from around 4 to over values on the order of 10 and Reynolds Numbers (defined as Re=VL/v) ranging from $10^7$ to over $10^9$, where V is velocity, L is length, v is kinematic air viscosity. Under these conditions, wavemaking constitutes only a small fraction in the drag budget. VHS Boats may generate aerodynamic drag comparable to or even in excess of all other forms of drag which dominate for lower-speed vessels.

Fundamentally, lift cannot be generated without inducing drag. Hence, for a properly designed VHS boat (See for example U.S. Pat. Nos. 5,452,676 and 4,231,314) which already has substantially reduced wetted areas at very high speeds, any hydrodynamic drag reduction resulting from aerodynamic lift could be more than rendered entirely useless by the unavoidable induced drag of the lift-generating airfoils. In addition, the structures of the wing assemblies which support and allowed adjustment hereforeto considered essential to attaching wings to boats (U.S. Pat. Nos. 978,311;

1,015,568; 1,889,927; 4,284,027; 4,827,862; 4,926,778; 4,940,433; 5,111,766; and U.S. patent application no. 2005/0247251) add even more drag. Similar to lift, drag scales according to $V^2$, where V is the vessel velocity. Therefore, it can be deduced that the drag of prior-art wing support and adjustment structures may increase by a factor of two to over four when transitioning from the above mentioned Re number and Fr number regimes the prior art is intended for to the very high speed ("VHS") regime the current invention is intended for. These huge increases in drag with velocity render prior-art wing support and adjustment structures unfit for the VHS regime. Hence, the wing-support and adjustment structures in the present invention are not only aerodynamically concealed, but also prevent any increases in aerodynamic cross section through wings positioned away from or protruding substantially from the hull.

Additionally, the reduced hydrodynamic contact at high speeds can make a VHS boat dangerous to operate and very hard to control when pitch, roll, and yaw angles exceed certain boat, water, and ambient-dependent conditions. Negative pitch angles ("nose down") may lead to the bow plowing into waves. This scenario, commonly known as "stuffing," can lead to loss of control of the boat. Large positive pitch angles ("nose up") may result in the entire boat lifting out of the water. Alternatively, under rough water conditions, the boat may leave the water for a substantial amount of time. If the craft leaves the water with a high nose-up attitude, re-entry in the water at the transom can cause the boat to violently rotate forward submerging the bow. This sequence leads to "stuffing" is extremely dangerous and most likely will lead to an accident through loss of control.

VHS boats generally operate in the planing regime where the sinkage is much smaller than the actual hull weight. With these "high riding" hulls, the longitudinal axis of inertia is close to or sometimes even higher than the waterline. These conditions may result in potentially dangerous instability called "chine walking" where the hull rolls (seen from behind) clockwise until the starboard chine will be sufficiently under water to generate a hydraulic pressure field with a moment about the longitudinal axis of inertia large enough to cause the hull to subsequently roll counterclockwise until the port chine will react similarly to induce again a clockwise roll. Under certain circumstances, the growth in angular amplitude of this instability may not be dampened resulting in dangerous uncontrollability of the boat.

A sufficiently large yaw angle may result in the equally dangerous phenomenon called "hooking" where the hull suddenly and uncontrollably spins as a result of sudden hydraulic drag generated from the bow (in waves or during porpoising) causing a sudden moment about the vertical axis of inertia.

Applicant has discovered that applying lift to the hull in a manner which decreases the hydrodynamic pressure drag also reduces the hydrodynamic friction drag as a result of decreased sinkage and wetted surface.

Applicant also has discovered that wings forward and aft of the center of inertia can generate a net moment which either lifts the transom, lifts the bow, or lifts transom and bow equally ("pitch neutral").

Further, Applicant has discovered that wings in the vicinity of the center of inertia can generate an essentially "pitch neutral" lift force.

Applicant, in addition, has discovered that separate wings on the port and starboard side of the center of inertia can result in a net moment which either lifts the port side, lifts the starboard side, or lifts the port and starboard side equally.

Applicant, moreover, has discovered that vertical wings on the port and starboard side of the center of inertia can result in a net moment which pulls the boat towards the port side, pulls the boat to the starboard side, or keeps the alignment of the boat in the direction of travel.

Applicant has also discovered that the downwash, fundamental to the process of airfoils generating lift, can be effectively used to decrease aerodynamic pressure drag on the hull by increasing the base pressure levels at the transom surface.

In addition, Applicant has discovered that eroding the hull shape around the bow area of a mono (v) type hull, where static pressure contours reach the highest levels of the entire hull, result in reduced aerodynamic pressure drag.

Applicant has additionally discovered that a forward wing or wings designed as a leading edge to the tunnel or tunnels of a multi-hull vessel can be used to control lift generated in the tunnel or tunnels through controlling tunnel inlet conditions.

Applicant has also discovered that using wavy leading edges in the low-aspect wings used in this invention improves the lift to drag characteristics.

Applicant has further discovered that by providing aerodynamic air channels to feed the wings, the wings can be used effectively to generate lift without increasing the aerodynamic cross section of the vessel, while aerodynamically concealing the wing-support and adjustment structures.

Although each and every feature of the present invention can be individually practiced advantageously by those skilled in the art, applicant has discovered that selected combinations of the inventive aspects, or all of the inventive aspects, can be advantageously integrated in a synergistic manner.

It is an object of the present invention to increase the top-end speed of a VHS boat through the reduction of overall drag.

It is an additional objective of the present invention to provide methods and means to control trim by aerodynamically adjusting the pitching moment about the center of inertia.

It is yet an additional objective of the present invention to provide methods and means to support and control wings used to generate aerodynamic lift without drag-generating structures.

It is a further object of the present invention to provide methods and means to control the lift generated in a tunnel or tunnels of a multi-hull vessel by controlling the inlet conditions of the tunnel or tunnels.

It is still further an object of the present invention to provide methods and means for making a VHS boat more controllable and thus safer to drive at the performance envelope by reducing or controlling chine walking or heeling through an aerodynamically-generated rolling moment.

It is another object of the present invention to provide a method of making a VHS boat more controllable and thus safer to drive at the performance envelope by reducing or controlling hooking through an aerodynamically-generated yawing moment.

It is yet another object of the present invention to improve fuel efficiency through the reduction of overall drag.

SUMMARY OF THE INVENTION

The present invention provides methods and apparatus for reducing hydrodynamic and aerodynamic drag in addition to controlling the attitude of high-speed boats using multiple wings. By providing aerodynamic lift, the required hydrodynamic lift and hence the hydrodynamic pressure drag is reduced. Additionally, the aerodynamic lift reduces the hydro-dynamically wetted area and hence also reduces the hydrodynamic skin-friction drag. Typically, when generating aerodynamic lift, unavoidably aerodynamic drag is induced.

In the present invention such aerodynamic drag is offset by aerodynamic drag reduction through base-pressure increases of the transom achieved by the use of the generally undesirable downwash inherent to generating high lift with airfoils. Additionally, eroding the hull shape around the bow for mono (v) type hulls in high static-pressure areas allows forward lift-generating elements to provide synergy without the need for drag-generating wing-support and adjustment structures. Using wings as leading-edge of the roof of the tunnel or tunnels in a multi-hull boat such as a catamaran provides synergy by allowing lift generation in the front of the boat in addition to controlling airflow into the tunnel or tunnels without the need for drag-generating wing-support and wing-adjustment structures and without increasing the aerodynamic cross section. Aerodynamic-drag minimization can be further enhanced through wake management using downwash from horizontal wings mounted near the deck and vertical wings mounted on the freeboard in the vicinity of the transom. The performance of low-aspect ratio wings used in the present invention can profit from wavy leading edges which essentially compartmentalizes lift between troughs. Using aerodynamic channels eroded or carved out from the deck shape and the freeboard shape, the aft wings can be also supported and adjusted without the need for drag-generating structures. The use of independently adjustable wings (forward, aft, port and starboard) will provide a means to not only control sinkage and wetted surface, but also trim, heel, and yaw angles of the hull.

More particularly, the present invention is directed to methods and apparatus for integrating airfoils into a VHS boat hull to generate lift and reduce overall drag simultaneously through the advantageous use of airfoil-induced flows and by judicial erosion of the hull at the bow to avoid high stagnation-pressure areas. In particular, the high speeds VHS boats achieve allow appropriate airfoils to generate a significant fraction of the hull weight in aerodynamic lift. Although a reduction in sinkage and wetted surface, and thus a reduction in hydrodynamic pressure drag and hydrodynamic skin drag will be achieved, this would normally be offset by the induced aerodynamic drag which is fundamentally tied to generating lift with airfoils. Typically, the higher the lift generated the higher the induced drag. With an example embodiment of the present invention, more lift from a given total airfoil surface area is achieved by using multiple airfoils. Here the flow leaving the high-pressure side at the trailing edge of the first airfoil energizes the boundary layer of the suction side of the downstream airfoil. Of course, in accordance with the present invention, a third similarly arranged airfoil downstream of the second airfoil could be added and so on. This arrangement allows extreme angles of attack of these downstream airfoil(s) without the risk of lift-destroying and drag-inducing flow-separation at the suction side of the said downstream airfoil(s). The higher the lift the higher the downward motion of the air leaving the wing comprised of one or more airfoils in the above described arrangement. To prevent tip losses in these relatively low-aspect ratio airfoil systems, generally, endplates or winglets are fitted.

A hydrodynamically proper-designed VHS boat at very high speeds (Froude numbers ranging from around 4 to over values on the order of 10; Reynolds Numbers VL/v ranging from $10^7$ to over $10^9$, where V is velocity, L is length, v is kinematic air viscosity) can generate aerodynamic drag on the order of or even in excess of the hydrodynamic drag. The contributions of wake forces and flow in the vicinity of the stagnation point dominate aerodynamic drag.

Generally, the transom is arranged to allow mounting drives, trim tabs, rudders and other appendages common to surface boats. As such, aerodynamically, even the sleekest of vessels can be classified as a bluff body where air-flow separation will occur in the transom area. A bluff body can be defined as a body that, as a result of its shape, has a separated flow over a substantial part of its surface. An important feature of a bluff body is that there is a very strong interaction between the viscous and inviscid regions. If we consider the flow attached at the transom area when the boat is starting to move, the adverse pressure gradients the (inviscid) airflow imposes on the (viscous) boundary layer will be too great for the flow to remain attached. Separation may occur from sharp edges or from a continuous surface. In addition, the separation point may move in response to pressure gradients imposed by unsteady flow features in the wake. Usually bluff bodies induce flow separation at locations where the velocity at the edge of the boundary layer exceeds the free stream velocity.

It is a pivotal concept of the present invention to use the downwash of the aft wing to manage the aerodynamic wake flow at the transom of the boat. As explained above, high lift can be generated with wings consisting of multiple airfoils which generate high downwash flows. By directing the downwash over the transom area, the wake structure is fundamentally altered. Firstly, the separation is delayed as a result of energizing the boundary layer. Secondly, the expansion of the wake is curtailed. Thirdly, air is supplied directly to the low pressure transom base. All these induced physical phenomenon help increase the base pressure at the transom surface. The higher base pressure translates directly in lower aerodynamic drag. By eroding the hull surface for the approach flow to the aft wings, the wing supports and wing control equipment can be concealed without drag-inducing support frames or braces. For operation at lower velocities, the smaller induced drag of the airfoils may make it less disadvantageous to raise the entire aft and/or forward wing vertically upwards through mechanical means. When operating at VHS conditions, however, the present invention teaches an aerodynamic airflow channel to supply the aft wing. With such a channel, not only is the aerodynamic cross section limited to a similar wingless design, the need for high-drag wing-support and wing-adjustment structures is avoided completely through concealment in the hull.

In another embodiment of the present invention, aft-mounted vertical wings with trailing edges in the general vicinity of the intersection of freeboard and transom limit the transverse development of the wake and also delay the flow separation by energizing the boundary layer at adverse pressure-gradient conditions in addition to supplying air directly to the low pressure transom base. Again, these induced physical phenomenon help further increase the base pressure at the transom surface decreasing aerodynamic drag.

Detailed Computational Fluid Dynamical ("CFD") calculations of the airflow around boat hulls have revealed significant high static-pressure areas around the bow of a mono (v) type hull. In one example embodiment of the present invention, the bow shape is eroded to eliminate the high static-pressure areas of a mono (v) type hull. Decreased high static pressure areas in the front of the hull decreases pressure drag. The terms "erode" and "eroding" used herein in connection with the shape of the bow or other parts of a hull, a deck or a cabin are meant to signify a modification of the shape by, for example removing or carving out material from the indicated area. For example, the bow shape may be eroded by forming channels in either side of the bow, as will be discussed in detail below in connection with various example embodiments of the invention.

In accordance with an example embodiment of the present invention, eroding the bow shape allows integrating the forward wings of a mono (v) type hull into the hull envelope without increasing the total frontal area of the hull. This integration of the lift function of the forward wings and the reduction in high static-pressure frontal area is achieved in part by concealing wing supports and wing control equipment in the eroded bow shape in a manner which completely avoids drag-inducing support frames or braces.

For hulls with closed-surface superstructures such as a cabin roof in the vicinity of the center of inertia, eroding the surface upstream allows for an approach flow to lift-generating pitch-neutral wings without increasing the flow cross-sectional area and without drag-inducing support frames, braces, or wing control equipment.

For multi-hull boats operating at high velocities, the air compacted in the contracting tunnel or tunnels running along part or virtually the entire length of the hull produces upward lift, which, in many cases determines the safety envelope of the craft. Beyond these limits, multi-hulls can lift off the water entirely, resulting in dangerous loss of control. On the other hand, when a multi-hull boat runs in waters with significant waves, the boat can pitch forward between waves and impact the water surface with the roof of the tunnel. As this generally flat surface of the tunnel roof impacts the water, a sudden instantaneous generation of large hydrodynamic forces will be experienced as uncomfortable and could be potentially dangerous to occupants of the boat. The amount of air captured by the inlet of the tunnel as well as the degree of air compaction is completely determined by the size of the tunnel, the degree of contraction of the tunnel, as well as the attitude of the boat during operation. The attitude of the boat is determined by many complex factors which, in accordance with example embodiments of the present invention, are controlled through the net moment about the center of inertia created by differential lift generated between the forward and aft wings. By using a forward wing or wings at the leading edge of the tunnel, not only can forward lift be controlled by adjusting the position and attitude of the wing but also the amount of air captured by the tunnel can be controlled. The synergy of controlling tunnel inlet conditions as well as forward lift gives additional control thus far unavailable in the prior art.

Although it is disclosed herein that wing-tip vortex losses can be controlled for the relatively low-aspect ratio wings used with the present invention by using endplates, in a further example embodiment of the present invention the use of a wavy leading edge ("tubercles") on the wings is proposed for controlling wing-tip vortex losses. With the wavy leading edges, lift is essentially compartmentalized between troughs. Therefore, the wing vortex can be seen as the response of the tubercle closest to the wing tip instead of the entire wing.

As described above, any VHS boat has a design and conditions-dependent performance envelope within which it can achieve its maximum performance, both in terms of speed and fuel efficiency. Beyond this performance envelope, there is a boat-specific and conditions-dependent safety envelope beyond which the vessel is uncontrollable and prone to serious accidents. This performance as well as safety envelope can be quantified for a specific boat by complex conditions-dependent sinkage, wetted surface, trim, heel, and yaw angle combinations beyond which will occur loss of performance and loss of control, respectively.

In example embodiments of the present invention, the speeds generally achieved by VHS boats will allow generation of aerodynamic forces large enough to push extraneous attitude angles back inside the safety and/or performance envelope by independently adjusting each airfoil position and angle of attack. For example, to correct trim (nose-up or nose-down), a differential lift between the wings forward and aft of the center of inertia can be generated. To correct heel, a differential lift between the wings port and starboard of the center of inertia can be generated. To correct yaw, a differential lift between the vertical port and vertical starboard wings can be generated. As someone skilled in the art will appreciate, using independent control of all wings allows much more complex combinations of attitude angles of the boat position to be corrected. It also will be recognized by someone skilled in the art that fast-acting actuators can be used in conjunction with devices which can detect the boat attitude like gyros to set the position and angles of attack of the wings faster than may be otherwise possible.

The present invention encompasses methods and apparatus in accordance with the foregoing description.

BRIEF DESCRIPTION OF THE DRAWINGS

The following drawings in which like reference characters indicate like parts are illustrative of example embodiments of the invention and are not meant to limit the scope of the invention as encompassed by the claims of the application

FIG. 2A is a plan view of an example embodiment of the present invention as applied to a mono (v) type hull.

FIG. 2B is a side view of the example embodiment shown in FIG. 2A.

DETAILED DESCRIPTION

Figure 1:
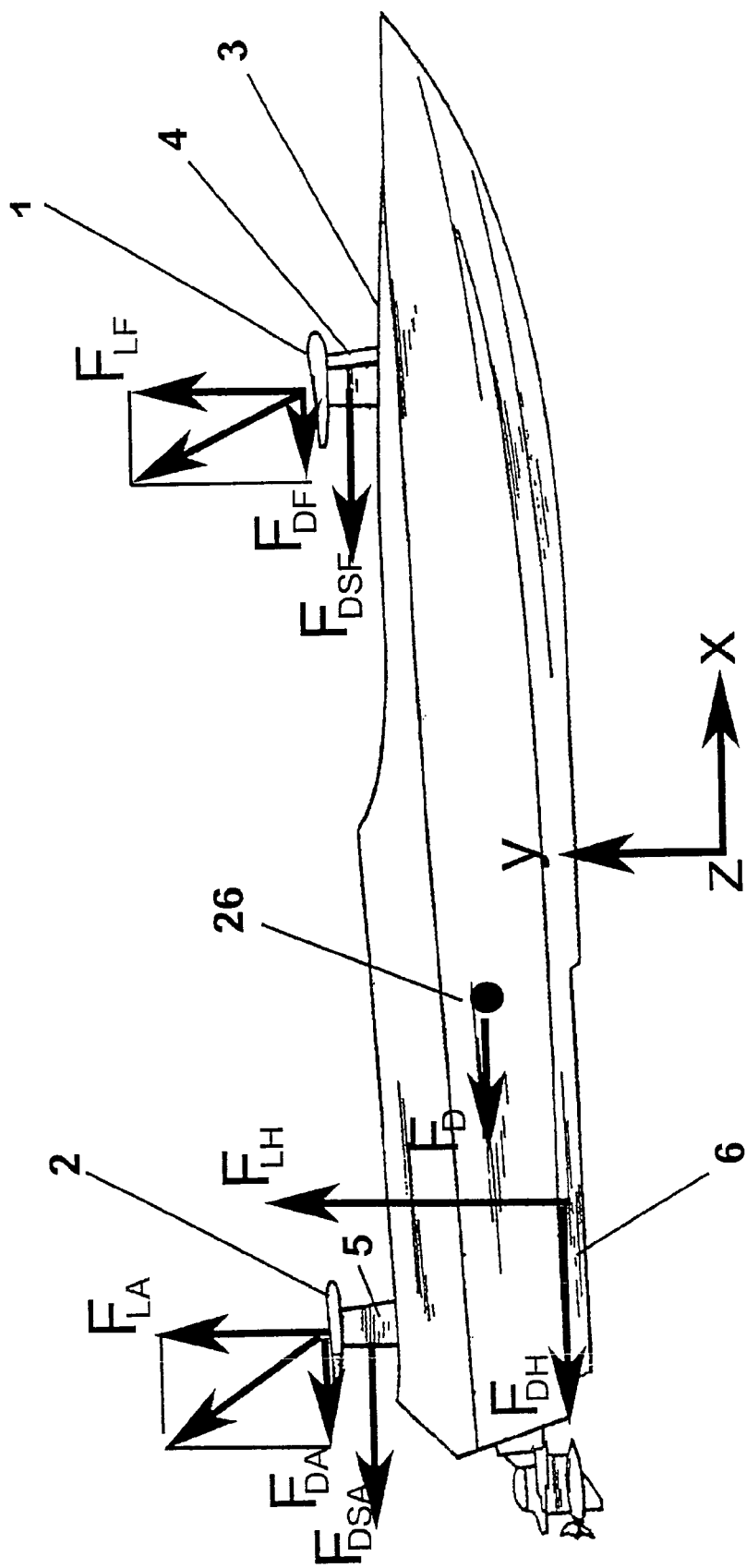
FIG. 1 is a perspective view of a typical side view of a prior art boat.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Although each aspect of the example embodiments of the present invention discussed in detail below can be applied to reduce drag, to increase fuel efficiency, and/or to control the attitude of a VHS boat, integrating a selection of some or all aspects of the example embodiments described herein provides a synergism otherwise not achievable. For example, the use of multi-foil wings to create lift in the aft section of the vessel allows high lift coefficients at the expense of high downwash normally considered undesirable. Here the downwash is used to increase pressure at the transom through a reduction of the wake and thus contributes positively to a reduction of wake drag of the boat. In another example embodiment, the placement of the forward wing as the leading edge of the roof of the tunnel of a catamaran allows not only the control of forward lift but also the control of inlet flow conditions to the tunnel, which in turn controls the lift characteristics of the entire tunnel.

Note that forces are indicated by vectors in the drawings. Although all the vectors used in the drawings indicate direction and magnitude, the length of the vectors in the drawings of this disclosure are for illustrative purposes only and no quantitative conclusions should be drawn from them. For description purposes a right-hand rule conventional coordinate system attached to the boat is used. The x-axis is parallel with the longitudinal axis of the boat with its positive direction from transom to bow. The y-axis is parallel to the waterline and perpendicular to the longitudinal axis of the boat with its positive direction is from starboard to port side. The z-axis is perpendicular to the x and y axis with its positive direction pointed upwards and away from the waterline.

FIG. 1 shows a typical prior-art mono (v) type hull with a forward wing 1 and an aft wing 2, positioned forward and aft of the center of inertia 26, respectively. The forward wing 1 is attached to the deck 3 with support 4. The aft wing 2 is attached to the deck 3 with support 5. Forward wing 1 generates lift force $F_{LF}$ at the expense of drag force $F_{DF}$. Aft wing 2 generates lift force $F_{LA}$ at the expense of drag force $F_{DA}$. The forward wing support 4 generates drag force $F_{DSF}$. The aft wing support 5 generates drag force $F_{DSA}$. By generating lift with the forward wing 1 and aft wing 2, the sinkage of the boat is reduced. This results in a reduced wetted area 6, which will in turn reduce the hydraulic drag $F_{DH}$ of the hull through a reduced pressure drag and a reduced friction drag from the water. For engineering purposes, drag of a body $F_D$ is commonly characterized by a drag coefficient $c_d$. $F_D$ furthermore scales with the cross-sectional area A presented to the fluid (water or air in this case), density of the fluid $\rho$, and the square of the velocity V of the body:

$$F_D = c_d \frac{1}{2} \rho V^2 A.$$

The mounting of the wings 1 and 2 away from the hull in the prior art increases the cross-sectional area of the original hull shape by not only the cross-sectional areas of wings 1 and 2 but also by the cross-sectional areas of wing supports 4 and 5. At limited velocities, the increased drag incurred from these wings and wing supports, with proper design, can be offset by the decreased hydraulic drag $F_{DH}$. However, for the very high speed (VHS) regime with Froude numbers ranging from around 4 to over values on the order of 10 and Reynolds Numbers VL/v ranging from $10^7$ to over $10^9$, the increased cross-sectional area and square dependency on velocity increases drag quickly beyond the drag reduction of $F_{DH}$. In the VHS regime, the prior art designs like that shown in FIG. 1 will actually experience higher total (hydraulic and aerodynamic) drag compared to a wingless hull.

Figure 2C:
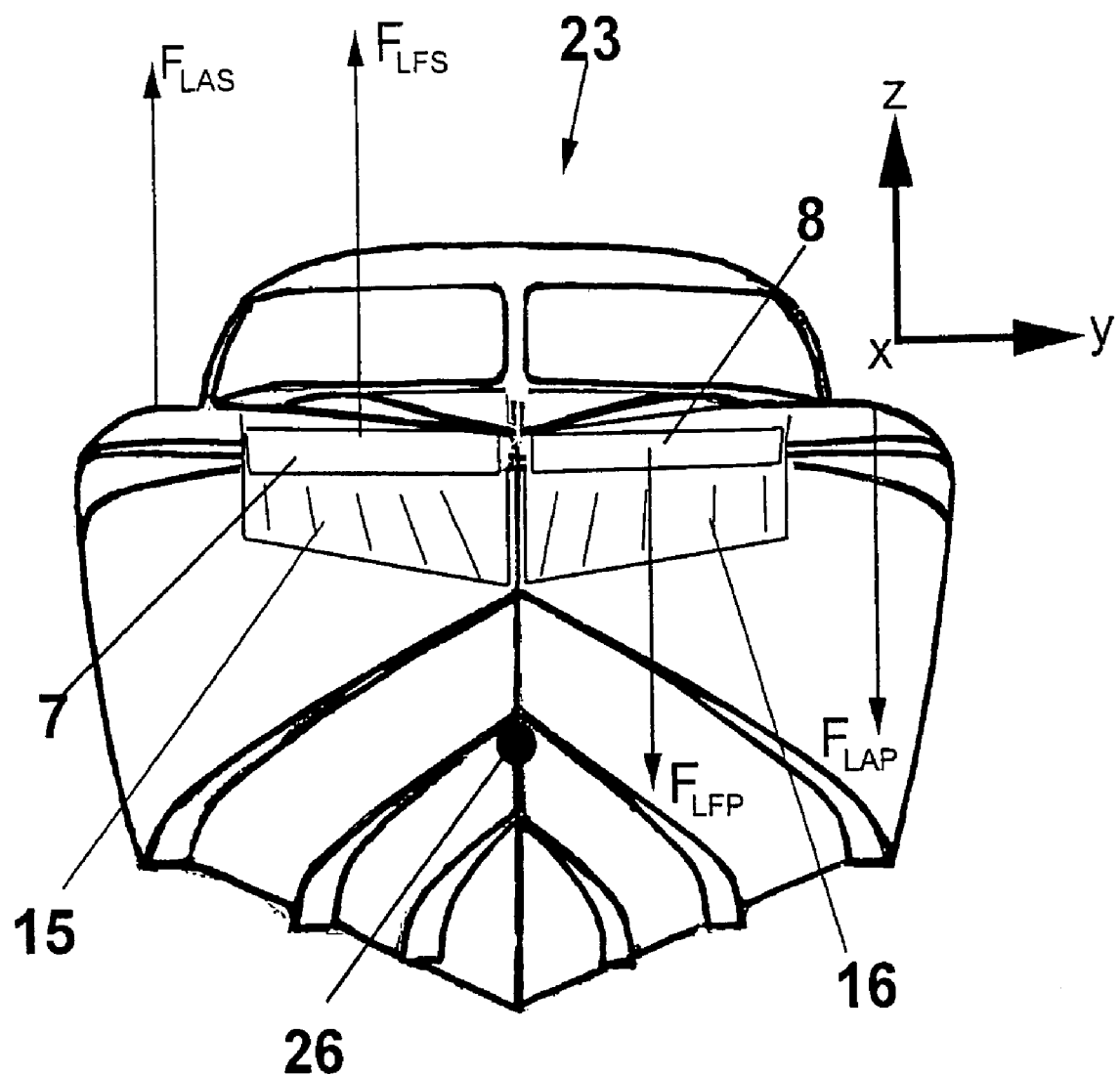
FIG. 2C is a front view of the example embodiment shown in FIG. 2A.

FIG. 2 (FIGS. 2A-2C) shows various example embodiments of the aerodynamic and hydrodynamic-drag reduction and attitude-control methods and apparatus for a Very-High-Speed mono (V-bottom) boat 23 in accordance with the present invention. For example, FIG. 2 shows forward wings 7 and 8, rear wings 9, 10, 11, 12, and vertical wings 19 and 20, forward air channels 13, 14 with corresponding inlets 13a and 14a and corresponding channel floors 15 and 16, rear air channels 17 and 18, and side air channel 21 and 22. Wings 7, 8, 9, 10, 11, 12, 19, and 20 are mounted such that the original hull envelop essentially is unchanged in its aerodynamic cross-section.

Those skilled in the art should appreciate that although FIG. 2 shows two pairs of rear wings 9, 10 and 11, 12, the present invention may be implemented with a single wing on the rear port side and a single wing on the rear starboard side. Further, additional wings may be used in series with the two pairs of rear wings shown in FIG. 2. In addition, multiple wings may be also used in the bow, for example a pair of wings on each side of the bow arranged in series in each air channel 13, 14. Finally, those skilled in the art should appreciate that beneficial results may be achieved when using only a single wing configured in accordance with the present invention. For example, the present invention may be implemented with only a single wing having a corresponding air channel in the front of the boat, with only a single wing having a corresponding air channel on the rear of the boat, with only a single wing having a corresponding air channel on a center section of the boat, or with only a single wing having a corresponding air channel on the roof of a cabin section of the boat. Also, the present invention may be applied to a monohull vessel as shown in FIG. 2, a catamaran as shown in FIG. 8, or a multi-hull vessel, where the application of the present invention would be substantially similar to the example embodiments described below in connection with the catamaran.

In the example embodiment of the present invention shown in FIG. 2, in order to feed airflow to the forward wings 7 and 8, corresponding air channels 13, 14 with respective entrances 13a and 14a and floors 15 and 16 are eroded (i.e., carved out) from the bow shape. This general configuration achieves several synergistic goals. Firstly, this configuration enables mounting the wings 7 and 8 without significantly changing the shape of the forward deck 24, which avoids the increase in aerodynamic cross-section hereforeto associated with the application of wings on boats, as discussed above in connection with FIG. 1. Secondly, the wing configuration disclosed in the example embodiment of the present invention and shown in FIG. 2 allows concealing wing support and adjustment equipment inside the original hull shape, thereby avoiding any increases in drag-inducing protrusions hereforeto associated with the application of wings on boats, as discussed above in connection with FIG. 1. Thirdly, eroding the hull to form the air channels 13, 14 which feed the pressure side of the wings 7 and 8 eliminates the highest stagnation-pressure area which would otherwise contribute significantly to pressure drag.

In the example embodiment shown in FIG. 2, in order to feed airflow to the aft wings 9, 10, 11, and 12, air channels 17, 18 with gradually sculpted floors are eroded from the aft deck shape 30. This general configuration achieves several synergistic goals. Firstly, this configuration enables mounting the wings 9, 10, 11, and 12 without significantly changing the shape of the aft deck 30, which avoids the increase in aerodynamic cross-section hereforeto associated with the application of wings on boats. Secondly, the wing configuration disclosed in the example embodiment of the present invention shown in FIG. 2 allows concealing wing support and adjustment equipment inside the original hull shape, thereby avoiding any increases in drag-inducing protrusions. Thirdly, the transom area that is subject to suction pressure is decreased. Fourthly, the downwash from wings 9, 10, 11, and 12 may be used to decrease the recirculation zone and increase the base pressure of the transom.

FIG. 2B illustrates how lift force $F_{LF}$ generated by the forward wings 7, 8, pulls the bow upwards and decreases the sinkage reducing wetted area 25 and hence reducing hydraulic drag $F_{DH}$ through reduced pressure drag and reduced friction drag from the water. FIG. 2B also illustrates how lift force $F_{LA}$ generated by the aft wings 9, 10, 11, 12 pulls the transom upwards and decreases the sinkage reducing wetted area 25 and hence reducing hydraulic drag $F_{DH}$ through reduced pressure drag and reduced friction drag from the water.

The net moment of $F_{LA}$, $F_{DA}$, $F_{LF}$, $F_{DF}$ about the center of inertia 26 determines whether the net effect of the forward and aft wings is pitch-neutral, transom-lifting, or bow-lifting. It should be recognized that these attitude tendencies are controllable by choice of wing design and the angles of attack of the forward wings 7 and 8 and the aft wings 9, 10, 11, and 12.

When a VHS boat encounters large enough waves, the wetted surface 25 and hence the center of effort of the hydraulic forces $F_{DH}$ and $F_{LH}$ can change significantly as the boat proceeds through a wave. This changing center of effort and hence changing moment of these hydraulic forces about the center of inertia 26 (FIG. 2B) causes a transient pitch angle. The effects of this phenomenon called porpoising can range from passenger discomfort to the dangerous submerging (stuffing) of the bow. With statically adjusted bow wings 7 and 8, the amplitudes of the porpoising motion can be dampened. With actively controlled wings 7 and 8 using fast-acting actuators such as hydraulic cylinders, porpoising may be controlled through adjustment of pitch angles.

FIG. 2A illustrates how a larger lift force on the port side $F_{LSP}$ (and drag on the port side $F_{DSP}$) than lift force on the starboard side $F_{LSS}$ (and drag force on the starboard side $F_{DSS}$) results in a net clockwise moment about center of inertia 26 and will pull the transom to port and push the bow to starboard. A larger $F_{LSS}$ (and $F_{DSS}$) than $F_{LSP}$ (and $F_{DSP}$) results in a net counter-clockwise moment about center of inertia 26 and will pull the transom to starboard and push the bow to port.

In accordance with example embodiments of the present invention, by actively controlled adjustments to one or more of the wings using fast-acting actuators such as hydraulic cylinders, the phenomenon of hooking described above can be countered by controlling the yaw angle through aerodynamic means.

In the example embodiment shown in FIG. 2, in order to feed airflow to the vertical freeboard wings 19 and 20, air channels 21 and 22 with gradually sculpted floors are eroded from the freeboard shape. This general configuration achieves several synergistic goals. Firstly, this configuration enables mounting the wings 19 and 20 without significantly changing the shape of the freeboard 39, which avoids the increase in aerodynamic cross-section heretofore associated with the application of wings on boats. Secondly, the wing configuration disclosed in the example embodiment of the present invention shown in FIG. 2 allows concealing wing support and adjustment equipment inside the original hull shape, thereby avoiding any increases in drag-inducing protrusions. Thirdly, the transom area subject to suction pressure is decreased. Fourthly, downwash from wings 19 and 20 may be used to decrease the recirculation zone and increase the base pressure of the transom.

Referring to FIGS. 2A and 2C, it can be seen forward wings are split in a port foil (wing 8) and a starboard foil (wing 7), and aft wings are split in a port foil (wings 11, 12) and a starboard foil (wings 9, 10). From the example embodiment shown in FIG. 2C it is demonstrated how upwardly directed lift forces on the starboard side from aft wings 9 and 10 ($F_{LAS}$) and forward wing 7 ($F_{LFS}$) together with downwardly directed lift forces on the port side from aft wings 11 and 12 ($F_{LAP}$) and forward wing 8 ($F_{LFP}$) cause a net clockwise moment (seen from the front) about the center of inertia 26. This clockwise moment has the tendency to raise the starboard side and drop the port side of the boat. From this example it is clear that other airfoil adjustments can also cause the port side to lift and the starboard side to drop. With actively controlled adjustments in accordance with example embodiments of the present invention, using fast-acting actuators such as hydraulic cylinders, the phenomenon of chine walking described above can be countered through aerodynamic means.

From the simple examples of attitude correction about the 3 axis (chine walking about the longitudinal axis, pitching about the transverse axis, and yawing about the vertical axis) described above, it should be appreciated that the present invention is able to achieve active control over individual control surfaces using fast-acting actuators such as hydraulic cylinders for controlling wing adjustments, which enables correction of compounded attitude tendencies of the boat. Although skilled pilots may be able to react fast enough for simple repetitive corrections, ease of control and consistency can be obtained through the use of simple or advanced conventional control techniques which automatically adjust wing angles based on sensors such as gyrometers, accelerometers, global positioning systems (GPS), and the like.

Although the drag equation described above allows estimating the drag force through a mostly experimentally determined drag coefficient $c_D$, determining the actual aerodynamic drag acting on a body moving through the air requires solving a set of partial differential equations describing conservation of mass, momentum and energy. This set of partial differential equations is known as the "Navier-Stokes" (NS) equations. Only a few simple laminar-flow configurations exist for which analytical solutions can be obtained. Flows in which turbulence occurs, such as in the VHS problem, are entirely beyond the reach of analytical analysis. To analyze and predict the nature of such flow problems, numerical techniques are used to determine the flow variables such as velocity and pressure for a particular configuration. Although the NS equations describe turbulent flow, the spatial and temporal resolution required to solve the "instantaneous" NS equations directly ("Direct Numerical Simulation"—DNS) will stay beyond the reach of even the fastest computers for some time for most practical engineering flows. Whereas a simple analytical solution exists for pipe flow with Re numbers under 2000, direct simulation of a turbulent pipe flow with a Re number of $5.10^5$ requires a computer which is about 1 million times faster than the current generation supercomputers. The Re numbers of interest to VHS boats range from $10^7$ to over $10^9$ and require assumptions to be made regarding the nature of the turbulence a priori. For current engineering purposes, the density-weighted averaged (Favre-averaged) conservation equations were solved with a classical k–ε turbulence model to determine the Reynolds stresses and turbulent scalar transport terms which arise in conservation equations as a result of the averaging process.

Figure 3:
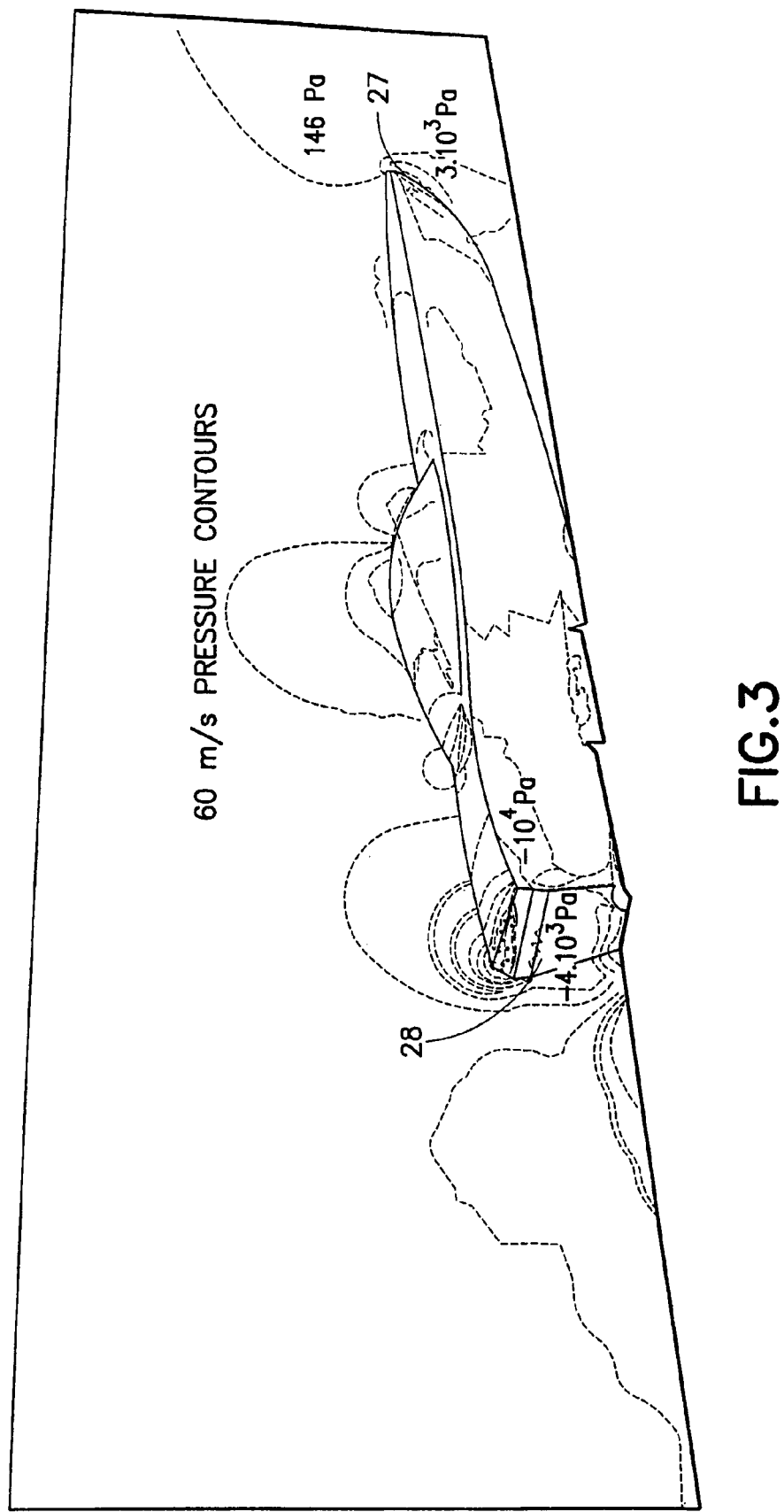
FIG. 3 is an example of the solution of the transport equations for a 47 ft mono (v) hull prior art powerboat running at 60 m/s showing the flow-generated high static pressure field in the bow area and the low static pressure field in the transom area.

An example of the results is illustrated in FIG. 3, which shows the iso-bar contours of the pressure field for a typical prior art VHS boat operating at 60 m/s. Even with the assumptions described above and using advanced gridding methods, the flow domain of a typical VHS boat still requires a minimum of around 1 million nodes. From the pressure contours it can be seen that the highest static pressures occur at a front area 27 at the bow of the boat. This area 27 is a large contributor to the pressure drag experienced by the boat. To attach the necessary appendages (drives, trim tabs) required to power and control a boat, the transom surface requires a large portion in an essentially rearward-facing orientation. The resulting acute angles between the deck and transom (back) of the boat causes flow separation with a large trailing recirculation zone shown at area 28. This recirculation zone 28 decreases the pressure at the transom, causing suction which is responsible for the majority of the pressure drag experienced by the boat.

Figure 4:
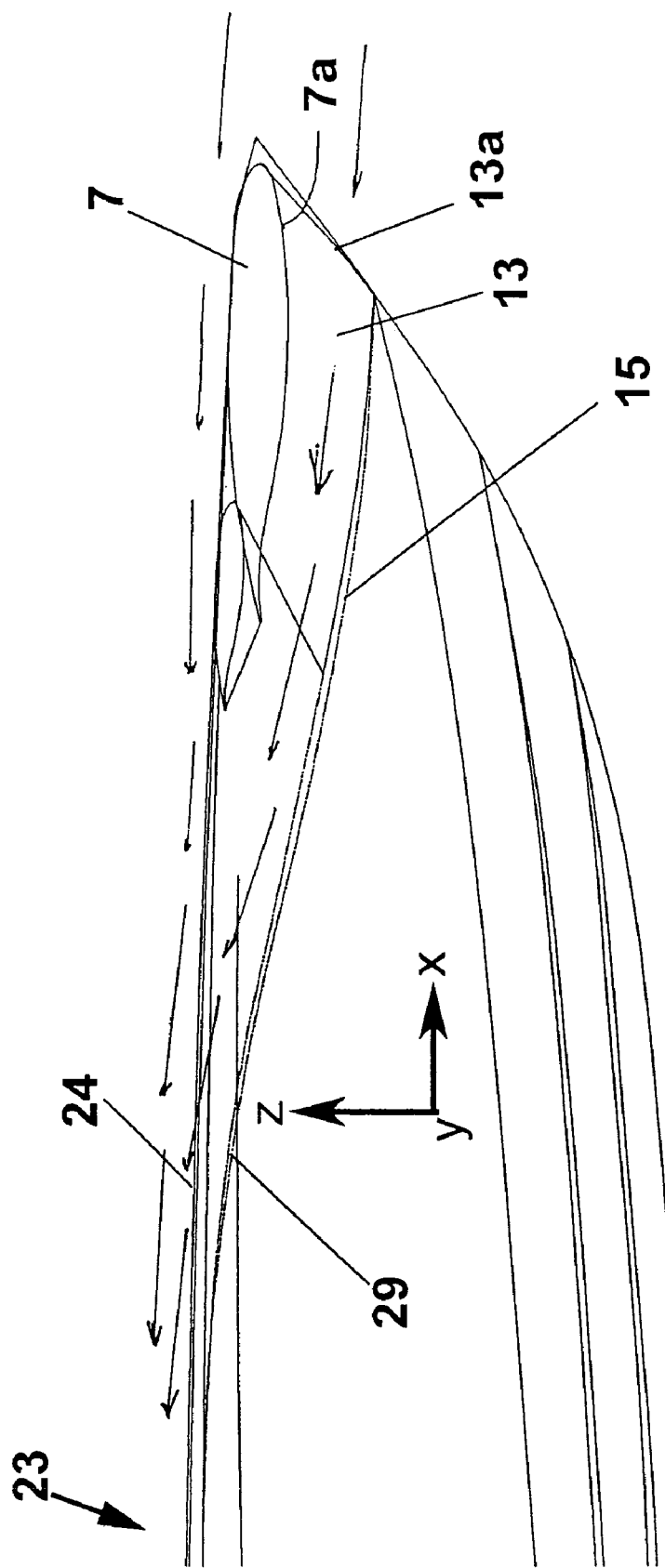
FIG. 4 is a perspective and cutaway view of the bow area example embodiment shown in FIG. 2A.

FIG. 4 shows a side view of the example embodiment of the front of the boat 23 discussed above in connection with FIG. 2. FIG. 4 shows wing 7, air channel 13 having an air channel inlet 13a and an air-channel floor 15. As discussed in connection with FIG. 2 above, the opposite (port) side of the bow has a corresponding wing 8, air channel 14, air channel inlet 14a, and air channel floor 16, which operate in the same manner as wing 7, air channel 13, air channel inlet 13a, and air channel floor 15. In operation, wings 7 and 8 are held at a pre-determined angle-of-attack with respect to the air flow. Air channel inlets 13a and 14a allow the pressure side of airfoils 7 and 8 to be fed. FIG. 4 shows the pressure side 7a of the wing 7. The air channel inlets 13a and 14a eliminate the highest stagnation pressure area (e.g., area 27 shown in FIG. 3), reducing pressure drag. The air-channel floors 15 and 16 are located sufficiently far from the pressure sides of wings 7 and 8 to prevent interaction of the airflow between the air-channel floors and the pressure sides of the wings. The air channel floors 15 and 17 are designed to smoothly direct the airflow over the deck 24. The gentle convex curvature in the portion 29 of the floors 15 and 16 keeps adverse pressure gradients at bay. In addition, the choice of airfoil design as shown in FIG. 4 with camber shifted towards the trailing edge of the wings 7, 8 helps in providing a higher pressure on floors 15 and 16 through downwash just upstream of the convex curvature of portion 29 preventing drag-inducting flow-separation at portion 29 of floors 15 and 16.

Figure 5:
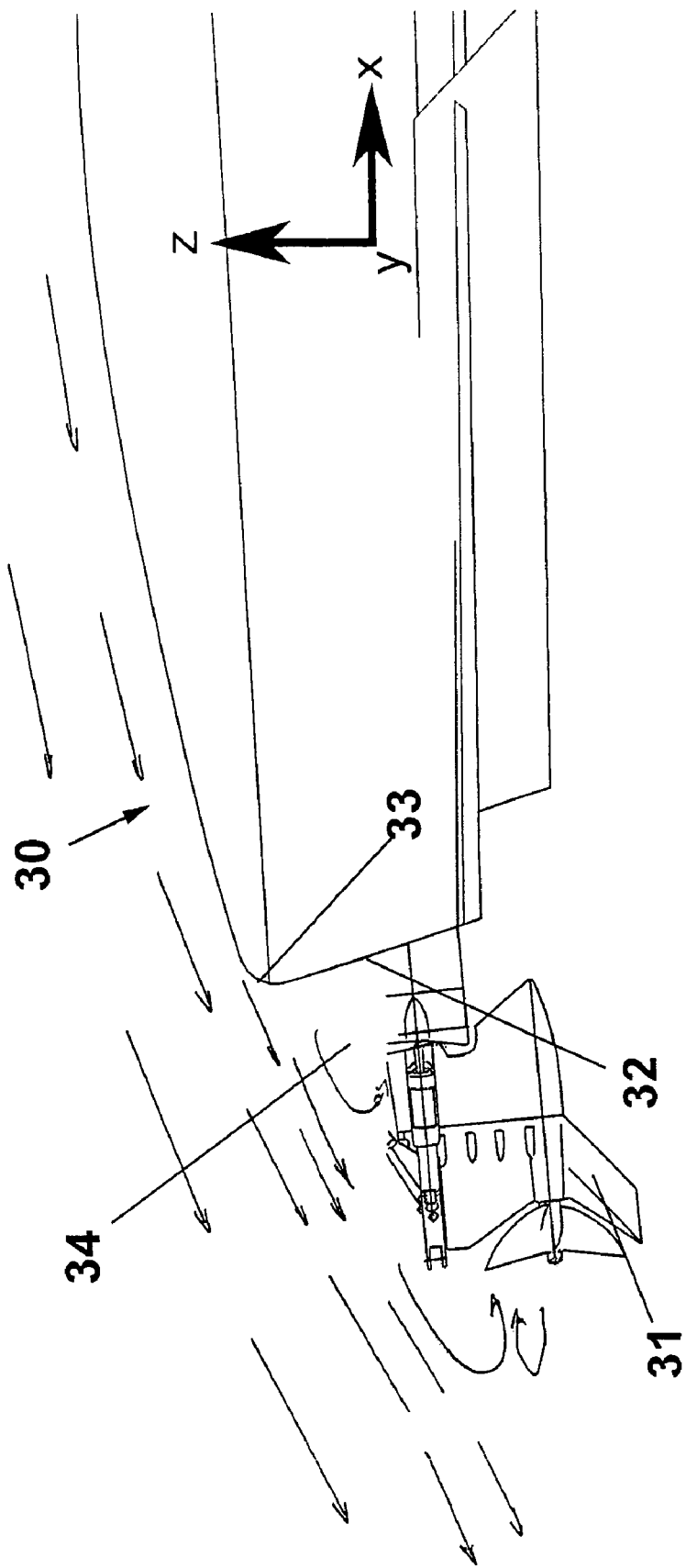
FIG. 5 is a perspective view of a typical side view of a prior art mono (v) hull boat showing the flow separation and the recirculation zone at the transom.

FIG. 5 shows the typical flow at the transom 32 of a prior-art boat. Although in the boat shown in FIG. 5 the rear deck 30 has been sculpted in a way conducive to smooth flow, the appendages such as drives 31 and trim tabs require an essentially rearward-facing transom 32. As a result of the large angle between rear deck 30 and transom 32, the flow is unable to follow the convex curvature against an adverse pressure gradient created off the transom 32 as the boat is in forward motion. This adverse pressure gradient causes the boundary-layer to separate at the juncture 33 of the rear deck 30 and transom 32, resulting in a large recirculation zone 34 downstream of the transom area. As can be seen in FIG. 3, a sub-atmospheric suction pressure is generated at area 28 near the transom 32 as a result of this recirculation zone 34. It is this suction at the base (transom) of the boat which contributes significantly to the aerodynamic drag of the boat.

Figure 6:
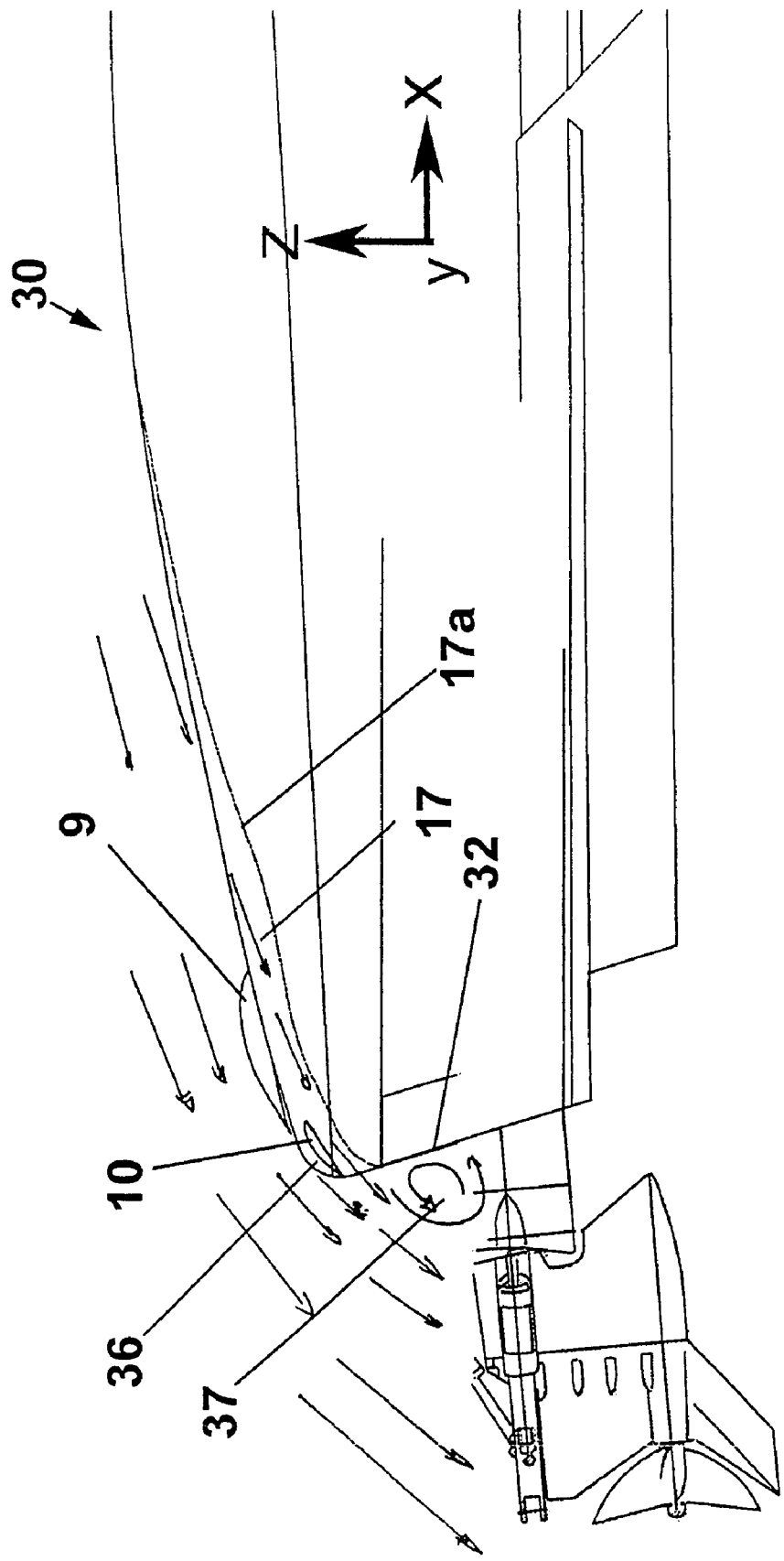
FIG. 6 is a perspective side view of the example embodiment shown in FIG. 2A showing the delayed flow separation and the strongly reduced recirculation zone at the transom.

FIG. 6 shows a side view of the example embodiment of the aft of the boat 23 discussed above in connection with FIG. 2. FIG. 6 shows wings 9 and 10, and air-channel 17. As discussed in connection with FIG. 2 above, the opposite (port) side of the aft of the boat 23 has corresponding wings 11 and 12, and air channel 18, which operate in the same manner as wings 9 and 10 and air channel 17. In operation, wings 9, 10, 11 and 12 are held at a pre-determined angle-of-attack with respect to the air flow. Air channels 17 and 18 have corresponding air channel floors (e.g., shown by 17a in FIG. 6) scalloped from the rear deck 30 that allow the pressure side of airfoils 9, 10, 11 and 12 to be fed. The air channels 17 and 18 allow airfoils 9, 10, 11 and 12 to generate lift without increasing the aerodynamic cross section. Additionally, the location of aft airfoils 9, 10, 11 and 12 allows aerodynamic concealment of wing supports and adjustment equipment. The floors (e.g., floor 17a) of the air-channels 17 and 18 are located sufficiently far from the pressure sides of wings 9, 10, 11 and 12 to prevent interaction of the airflow between the air-channel floors and the pressure sides of the wings. The air channel floors are designed to allow the downwash to delay boundary-layer separation at 36. The advantageous use of downwash results in a much reduced recirculation zone 37 downstream of the transom 32 and increased pressure at the transom surface reducing the pressure drag.

In the example embodiment shown in FIG. 6, a dual airfoil system is used on the port and starboard sides. As shown in FIG. 6, the dual airfoil on the starboard side consists of wings 9 and 10. A corresponding dual airfoil is provided on the port side, which consists of wings 11 and 12 as shown in FIG. 2. Referring to FIG. 6, for the starboard side, the twin airfoil system is configured such that the flow leaving the trailing edge of the upstream airfoil 9 is directed over suction side at the leading edge of the downstream airfoil 10. This configuration allows the second airfoil have a large angle of attack with the freestream without flow separation at the suction side as a result of re-energizing the suction-side boundary layer at the leading edge. Typically these configurations can have angles of attack of the downstream airfoil of 10°-30° or more. The strong downwash with acute downwardly directed flows are effective in delaying flow separation at 36 beyond that typically possible with single airfoil systems. Thus, such a dual airfoil arrangement provided in accordance with an example embodiment of the present invention is very suitable for increasing transom pressures through a strongly reduced recirculation zone 37, without causing significant amounts of drag.

Figure 7:
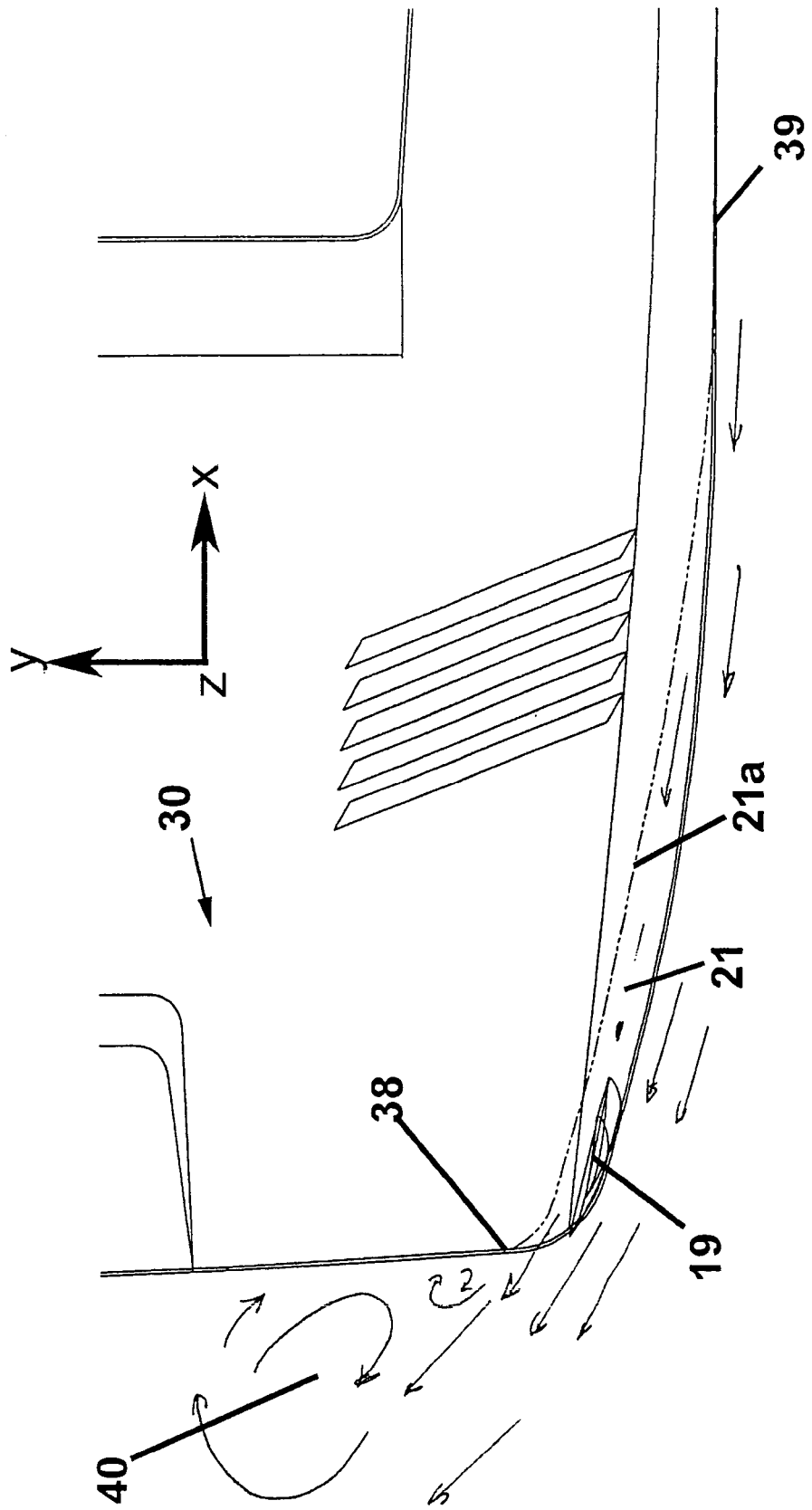
FIG. 7 is a plan and cutaway view of the transom/freeboard area of the example embodiment shown in FIG. 2A, showing the general flow characteristics as well as the transversely reduced wake development.

FIG. 7 shows a plan view of starboard side of the example embodiment of the aft of the boat 23 discussed above in connection with FIG. 2. FIG. 7 shows wing 19 and air-channel 21. As discussed in connection with FIG. 2 above, the port side of the aft portion of the boat 23 has a corresponding wing 20 and air channel 22, which operate in the same manner as wing 19 and air channel 21. In operation, wings 19 and 20 are held at a pre-determined angle-of-attack with respect to the airflow. Air channels 21 and 22 each has a floor scalloped from the freeboard 39 that allow the pressure side of airfoils 19 and 20 to be fed. FIG. 7 shows air channel floor 21a of air channel 21. Air channel 22 has a floor (not shown) that has a shape corresponding to that of floor 21a. The air channels 21 and 22 allow airfoils 19 and 20 to generate lift without increasing the aerodynamic cross section. Additionally, the location of aft airfoils 19 and 20 allows aerodynamic concealment of wing supports and adjustment equipment. The floors of air-channels 21 and 22 are located sufficiently far from the pressure side of wings 19 and 20 to prevent interaction of the airflow between the air-channel floors and the pressure sides of the wings. The air channel floors are designed to allow the downwash from airfoils 19 and 20 to delay boundary-layer separation at area 38. The advantageous use of downwash results in a much reduced recirculation zone 40 in transverse direction. This transversely-reduced recirculation zone 40 downstream of the transom 32 increases pressure at the transom surface and hence reduces the pressure drag. The configuration at the port side mirrors the configuration shown in FIG. 7 and described above for the starboard side.

The resulting flow downstream of the transom 32 as a result of the recirculation rotating in the x-z plane (FIG. 5 and FIG. 6) and the recirculation rotating in the x-y plane (FIG. 7) is a vortex ring. The size of the vortex ring in the z direction is greatly reduced through the downwash in the (negative) z direction from airfoils 9, 10, 11, and 12. The size of the vortex ring in the y direction is greatly reduced through the downwash in the positive y direction from starboard-side vertical airfoil 19 and through the downwash in the negative y direction from port-side vertical airfoil 20.

Figure 8A:
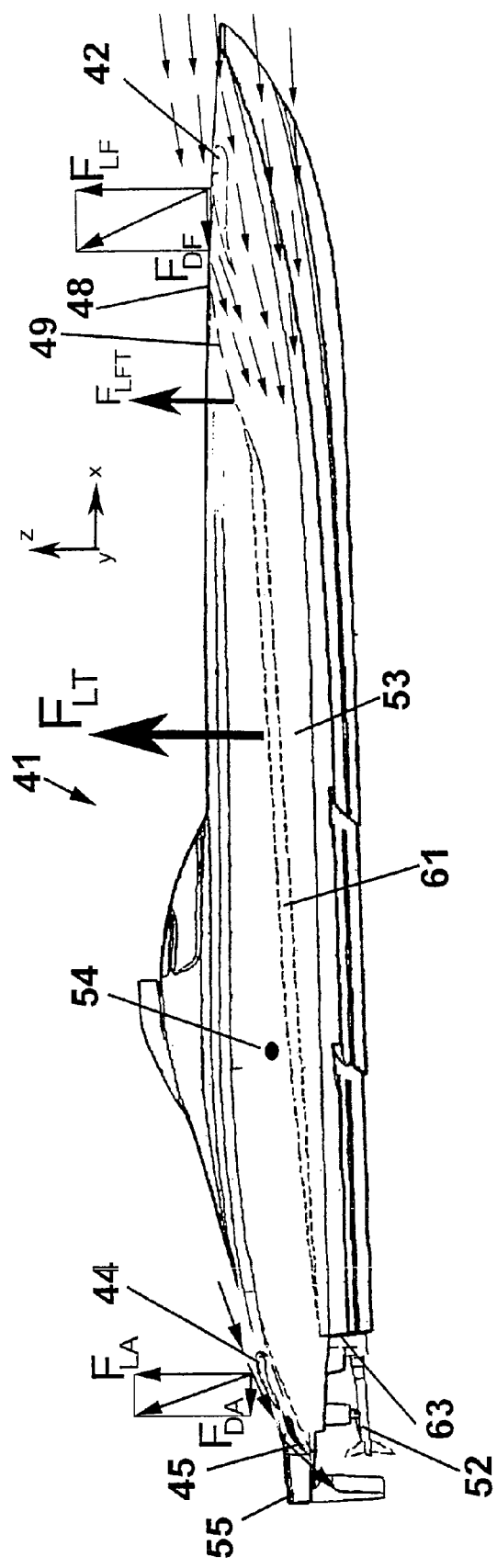
FIG. 8A is a side cutaway view of a further example embodiment of the present invention as applied to a catamaran-type hull.

A further example embodiment of the present invention is shown in FIGS. 8A-8D, wherein the concepts discussed above relating to aerodynamic and hydrodynamic-drag reduction and attitude-control are applied to a VHS multi-hull boat such as a catamaran 41. From frontal view shown in FIG. 8B, it can be seen that the hull of a catamaran is akin to a Mono (V-bottom) but split in the x-z plane of symmetry into sections 57, 58 and separated by distance $t_W$ which are connected through a roof 61 of a tunnel 53. The "split" halves 57 and 58 of the catamaran are commonly named sponsons. In this design, a tunnel 53 is formed by the roof 61, the inboard side 59 of starboard sponson 57 and inboard side 60 of port sponson 58. Generally, the cross-section of tunnel inlet 62 is larger than outlet 63 (FIG. 8A). The ratio of front cross-section 62 and aft cross-section 63 defines the contraction ratio of the tunnel. When the catamaran is propelled forward (in the positive x direction), it is this contraction which results in an above-atmospheric pressure in tunnel 53, which causes an upward force $F_{LT}$ (FIG. 8A) through pressure on tunnel roof 61. It is this upward force which reduces the wetted surface and hence the hydraulic drag of a catamaran. Higher contraction ratios of the tunnel 53 result in higher tunnel-generated lift at a given speed.

Figure 8B:
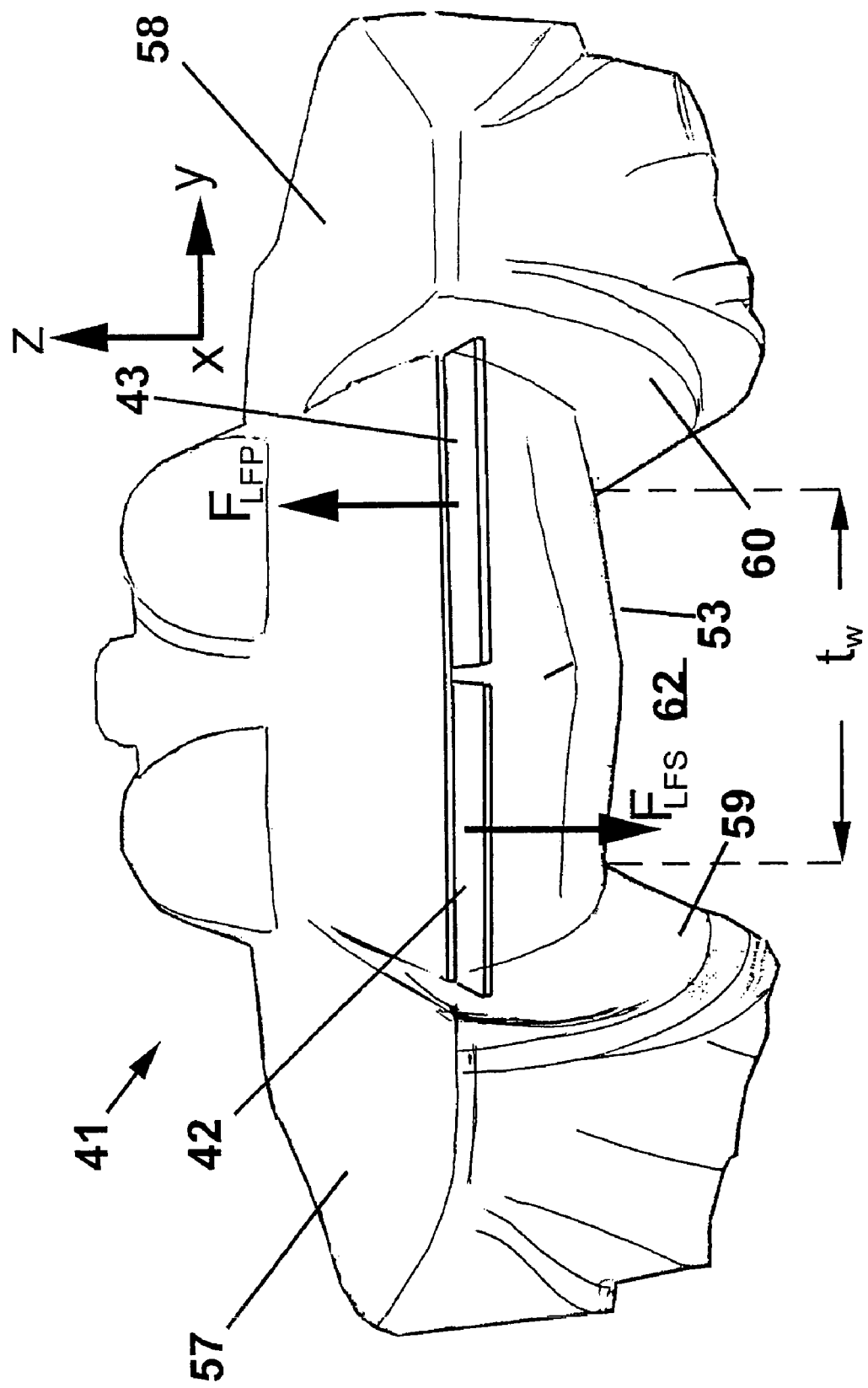
FIG. 8B is a front view of the example embodiment shown in FIG. 8A.
Figure 8C:
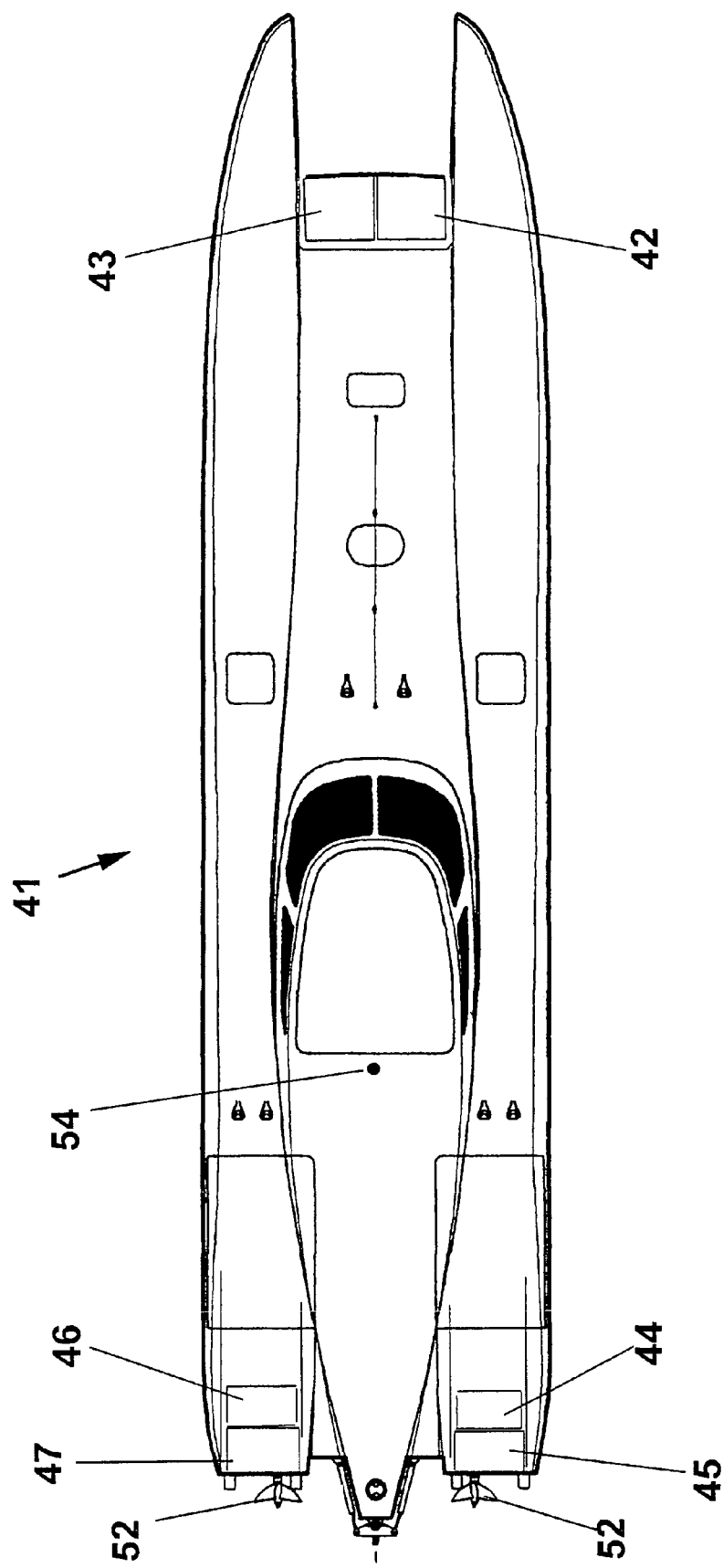
FIG. 8C is a plan view of the example embodiment shown in FIGS. 8A and 8B.

In the example embodiment shown in FIGS. 8A, 8B, and 8C, a forward starboard wing 42, a forward port wing 43, rear starboard wings 44 and 45, and port wings 46, and 47 are provided. As with prior-art catamarans, drive systems 52 with propellers are provided for propulsion and a rudder 55 is provided for steering. Although not shown in the Figures, those skilled in the art will appreciate that vertical wings, similar to wings 19 and 20 discussed above in connection with FIGS. 2 and 7 for a mono (V-bottom) boat can be used in a similar manner with multi-hull vessels. By placing forward wings 42 and 43 in place of the leading edged of tunnel 53 of a prior art catamaran, the aerodynamic cross-section of the bow of the catamaran is not increased.

As shown in FIG. 8A, similar to mono (V-bottom) hulls as described above, the net moment of $F_{LA}$, $F_{DA}$, $F_{LF}$, $F_{DF}$ about the center of inertia 54 determines whether the net effect of the forward and aft wings is pitch-neutral, transom-lifting, or bow-lifting. It should be recognized the attitude tendency with multi hulls like the catamaran 41 shown in FIGS. 8A and 8B, like with mono (V-bottom hulls), is controllable by choice of wing design and angles of attack of forward wings 42 and 43 and aft wings 44, 45, 46, and 47. Similar to mono (V-bottom) hulls, as described above, an appropriate net moment generated about the center of inertia 54 through the control of angles of attack of the individual air foils, can be used to correct phenomenon like porpoising and chine walking.

As can be appreciated from FIG. 8A, the leading edge 48 of the tunnel 53 is modified in accordance with an example embodiment of the present invention to provide a forward portion 49 of the tunnel roof 61 which is shaped as the pressure side of an airfoil. The shape of this forward portion 49 not only allows additional lift $F_{LFT}$ to be generated, but also increases the effective contraction ratio of the tunnel through downwardly directed downwash from the airfoils 42 and 43. Both effects synergistically increase the tunnel-generated lift $F_{LT}$ at a given speed. Alternatively, using the disclosed wing configuration without the shaped portion 49, allows similar lift to be generated at reduced tunnel contraction ratios. Hence, the present invention advantageously enables the design of vessels with a decreased aerodynamic cross-section and an improved lift-to-drag ratio.

Figure 8D:
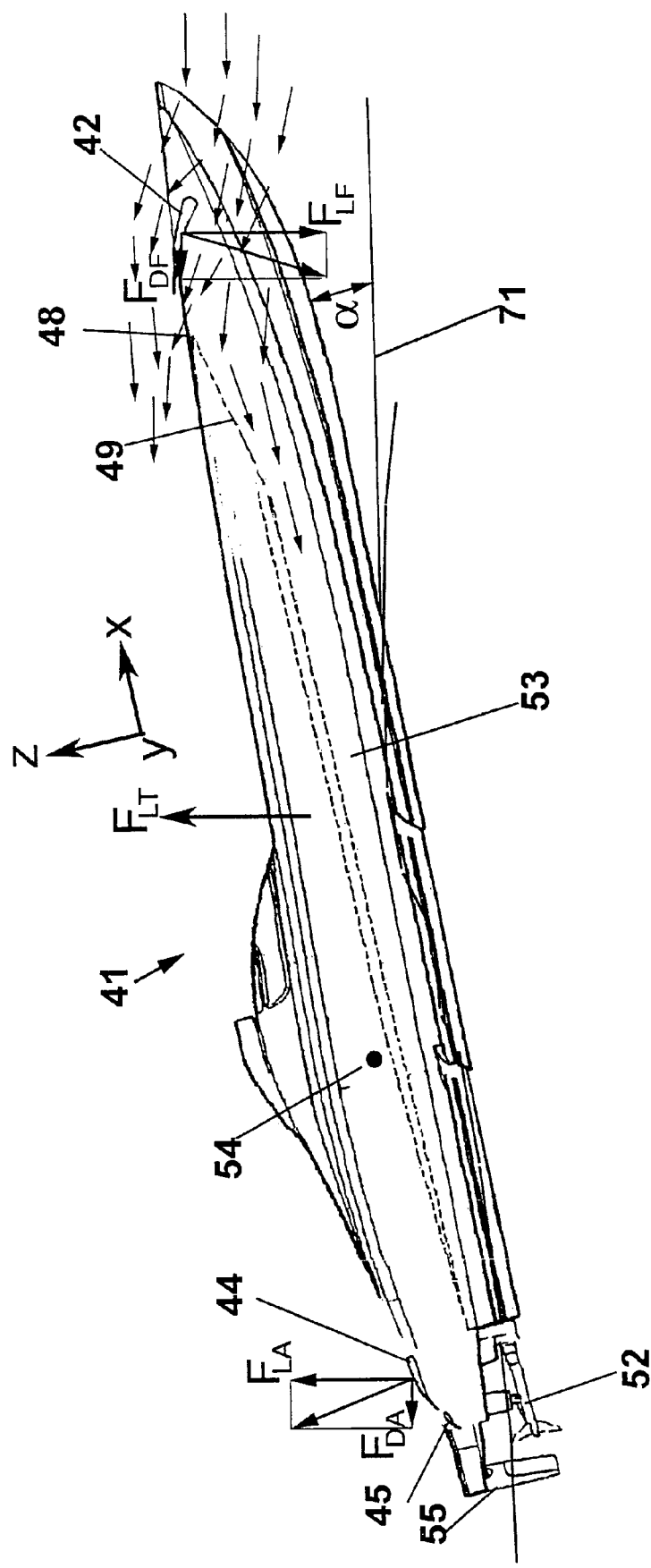
FIG. 8D is a side cutaway view of the example embodiment shown in FIG. 8a, which shows the general flow characteristics and forces induced by the forward and aft wings whereby an upward lift is induced aft, a downward lift is induced at the bow, and part of the tunnel inlet flow is diverged to counter a high attitude catamaran angle.

The upward force $F_{LT}$ generated in the tunnel 53 ultimately determines the performance envelope of the hull. Increasing the velocity beyond this performance envelope will eventually cause the entire hull to lift from the water initiating extremely dangerous conditions from which typically recovery is not possible. In this scenario, as depicted in the example embodiment shown in FIG. 8D, the catamaran hull initially lifts from the water surface 71 from the bow, increasing the angle α between the hull and the water surface 71 such that the tunnel 53 presents itself to the incoming air stream. Effectively, the increase in a increases the contraction ratio of the tunnel, which increases the upward lift $F_{LT}$ further. This increase in lift $F_{LT}$ increases a further. Thus it is clear that once the lifting of the bow has begun, the conditions are essentially unstable and the hull has a tendency to blow out of the water. In one example embodiment of the present invention, these dangerous conditions can be countered by a change in angle of attack of airfoils 42 and 43. By presenting a negative angle of attack with respect to the flow, a downwardly directed lift force is generated as shown in FIG. 8D in connection with an example embodiment of a catamaran in accordance with the present invention. This downwardly direct lift $L_{LF}$ provides a clockwise moment about center of inertia 54 pulling the bow back in a downward direction. A very advantageous synergistic effect of the present invention is that with such a wing angle of attack, the in-flowing air is diverted from the tunnel inlet, thereby reducing the effective tunnel contraction-ratio. This actively-controlled reduction in effective tunnel contraction-ratio will immediately decrease the tunnel-generated lift $F_{LT}$. The combined synergistic action of downward lift generated by the forward wings 42 and 43 and the "dumping" of tunnel-inlet air allows correcting dangerous lifting off of the hull at the onset. In one embodiment of the present invention, human-operated fast acting actuators controlling the airfoil angles may be used.

Figure 8E:
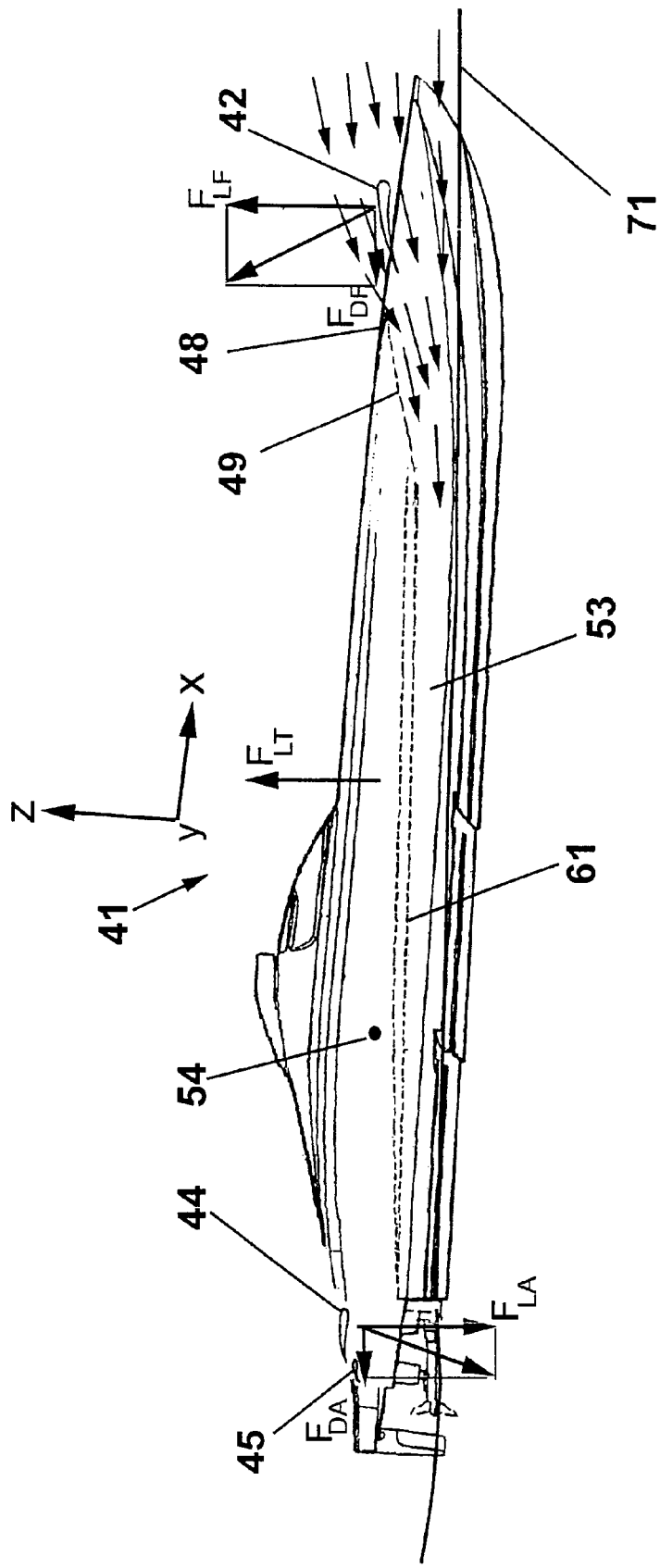
FIG. 8E is a side cutaway view of the example embodiment shown in FIG. 8a, which shows the general flow characteristics and forces induced by the forward and aft wings whereby a downward lift is induced aft, an upward lift is induced at the bow, and tunnel inlet flow is increased by the forward wing to counter a negative attitude catamaran angle.

When a multi-hull boat runs in waters with significant waves, the boat can pitch forward between waves and impact the water surface with the roof of the tunnel. As this generally flat surface of the tunnel roof impacts the water, a sudden instantaneous generation of large hydrodynamic forces will be experienced as uncomfortable and could be potentially dangerous to occupants of the boat. If these sudden large upwardly-directed hydrodynamic forces are not sufficient to lift the hull upwards, the bow may submerge into the water initiating extremely dangerous conditions from which typically recovery is not possible. FIG. 8E shows a catamaran in accordance with the present invention in the initial stages of such a scenario. In the example embodiment shown in FIG. 8E, the catamaran hull has initiated forward rotation about center of inertia 54 such that a diminishing inlet of tunnel 53 presents itself to the incoming air stream. Effectively, this forward rotation decreases the contraction ratio of tunnel 53, decreases lift $F_{LT}$, and increases the potential of the roof 61 of tunnel 53 to impact water surface 71. In one example embodiment of the present invention, these dangerous conditions can be countered by a change in angle of attack of airfoils 42 and 43. By presenting a positive angle of attack with respect to the flow, an upwardly directed lift force is generated as shown in FIG. 8E. This upwardly directed lift $L_{LF}$ provides a counter-clockwise moment about center of inertia 54 pulling the bow in an upward direction. A very advantageous synergistic effect of the present invention is that with such a wing angle of attack, the amount of air flowing into the tunnel inlet is increased, thereby increasing the effective tunnel contraction-ratio. This actively-controlled increase in effective tunnel contraction-ratio will immediately increase the tunnel-generated lift $F_{LT}$. The combined synergistic action of upward lift generated by the forward wings 42 and 43 and the increase of tunnel lift which acts forward of center of inertia 54 allows preventing the uncomfortable landing of the roof 61 of tunnel 53 on water surface 71. This prevention of the roof 61 of tunnel 53 to land harshly on water surface 71 can be further enhanced in the example embodiment by changing the angle of attack of rear wings 44, 45, 46, and 47 such that a downward force $F_{LA}$ is generated which also contributes to rotating the bow upwards by pulling the transom downwards. In one embodiment of the present invention, human-operated fast acting actuators controlling the airfoil angles may be used.

In a further example embodiment, boat-attitude information gathered through attitude-measuring instruments like gyroscopes, accelerometers and GPS systems allow automation of the forward wing angle-of-attack adjustments to keep the hull attitude within the safety envelope.

Figure 9:
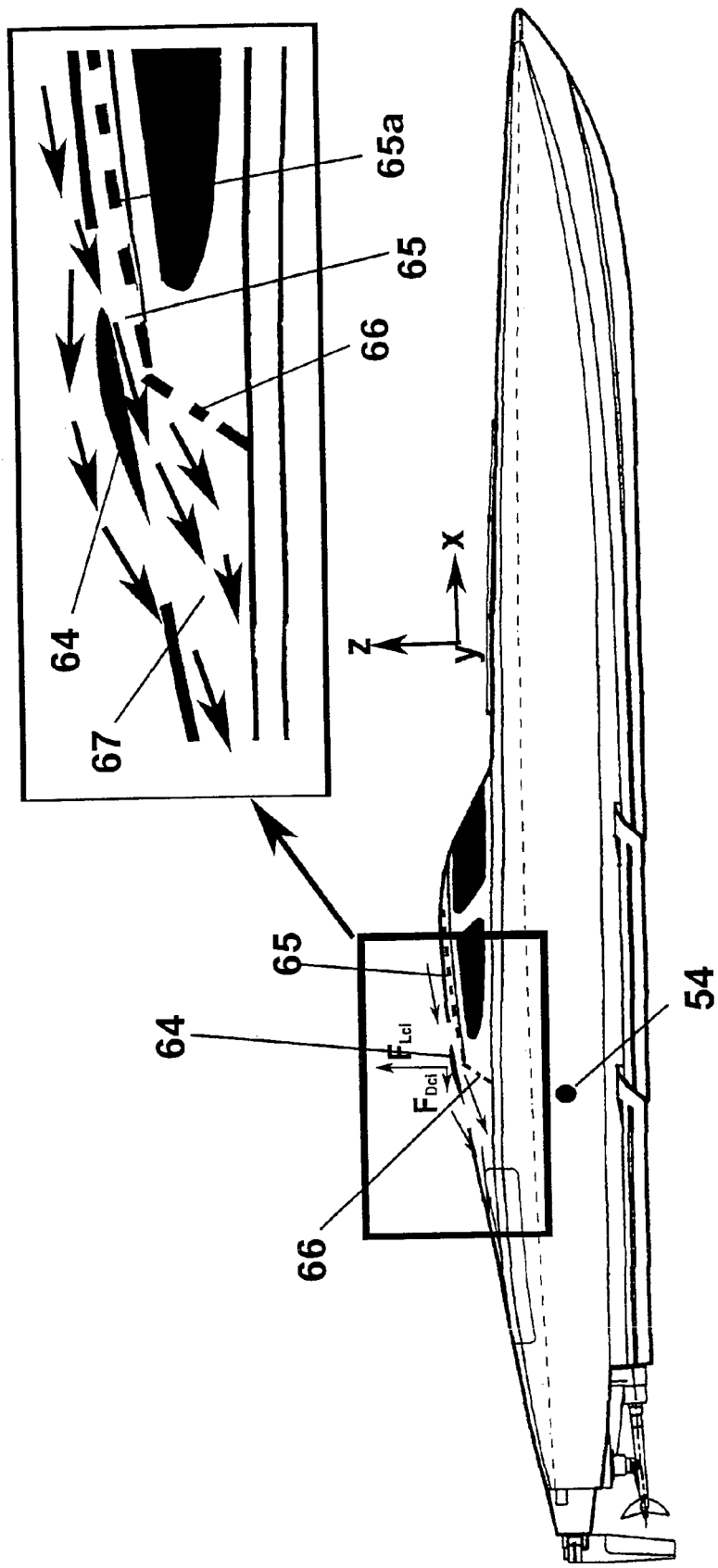
FIG. 9 is a side partial cutaway view of a further example embodiment of the present invention as applied to a catamaran-type hull utilizing a wing close to the center of inertia without increasing the aerodynamic cross section.

FIG. 9 shows a further example embodiment of the present invention. It is schematically depicted in FIG. 9 that a wing 64 mounted in the vicinity of the transverse axis of inertia (parallel to the y axis) will be able to generate pitch-neutral lift. Fitting an airfoil in the vicinity of the transverse axis of inertia ("central") and feeding said airfoil with an air channel 65 with a floor 65a eroded from the original hull surface generates lift without increasing the aerodynamic cross section. Downstream of the airfoil 64 a rearward facing window 66 may be placed simplifying rearward visibility for the occupants without causing undue pressure drag as a result of the curtailment of the trailing recirculation zone due to downwash flow 67. As with previous example embodiments discussed above, the wing configuration in the vicinity of the transverse axis of inertia allows aerodynamic concealment of wing supports and adjustment equipment.

Using air channels to feed airfoils in accordance with the example embodiments of the present invention discussed above not only prevents increases in aerodynamic cross sections and aerodynamically conceals wing support and adjustment structures, but also limits tip losses similar to that achieved with end plates. Particularly when forward, aft and/or central wings are split in starboard and port wings for the added control described above, the wings can be characterized as "low-aspect ratio". These low-aspect ratio wings can benefit from higher lift-to-drag ratios when tip devices are used. Although the concealed wings support and adjustment design described herein incorporate an end-plate like configuration where the development of tip vortices is somewhat suppressed, the use of customary tip devices such as endplates or winglets improve the lift-to-drag ratios further.

Figure 10:
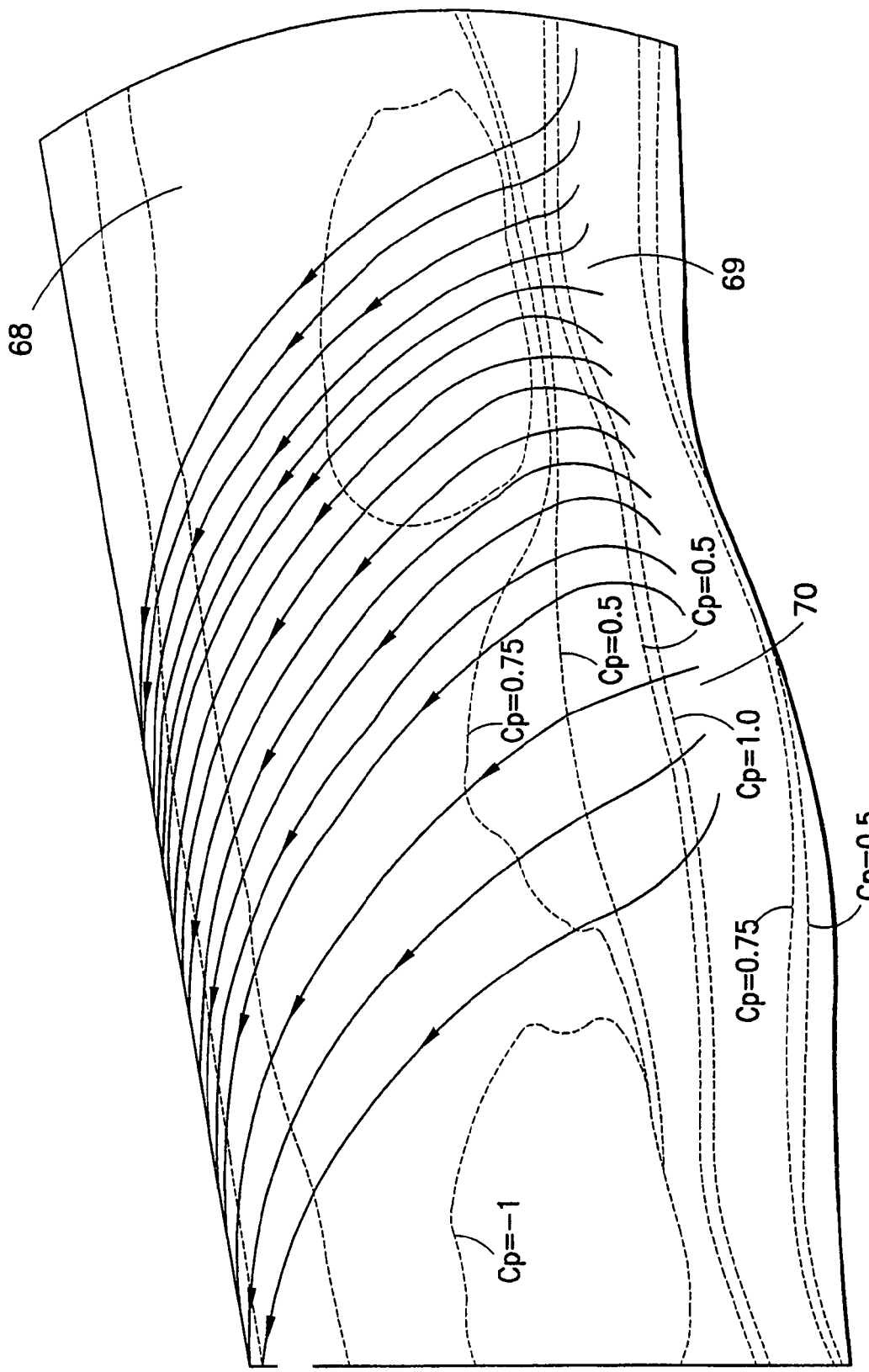
FIG. 10 is an example embodiment of a wing section with a wavy leading edge ("tubercle") in accordance with the present invention showing average streamlines around the hills and valleys.

In a further example embodiment of the present invention, by using a wavy leading edge in the generally low-aspect ratio wings, tip vortex losses are reduced. An example of such an embodiment of the present invention shown in FIG. 10, where it can be seen that the lift of such a modified wing 68 is essentially compartmentalized between the troughs 69 and hills 70. Now the tip vortex is a result of the tubercle closest to the wing tip rather than a result of the entire wing, diminishing the tip vortex losses or the need for endplates or winglets.

The following examples describe particular implementations of the present invention and are provided for descriptive purposes only. The following examples are not meant to limit the scope, applicability, or configuration of the present invention or the claims.

EXAMPLE I

Figure 11:
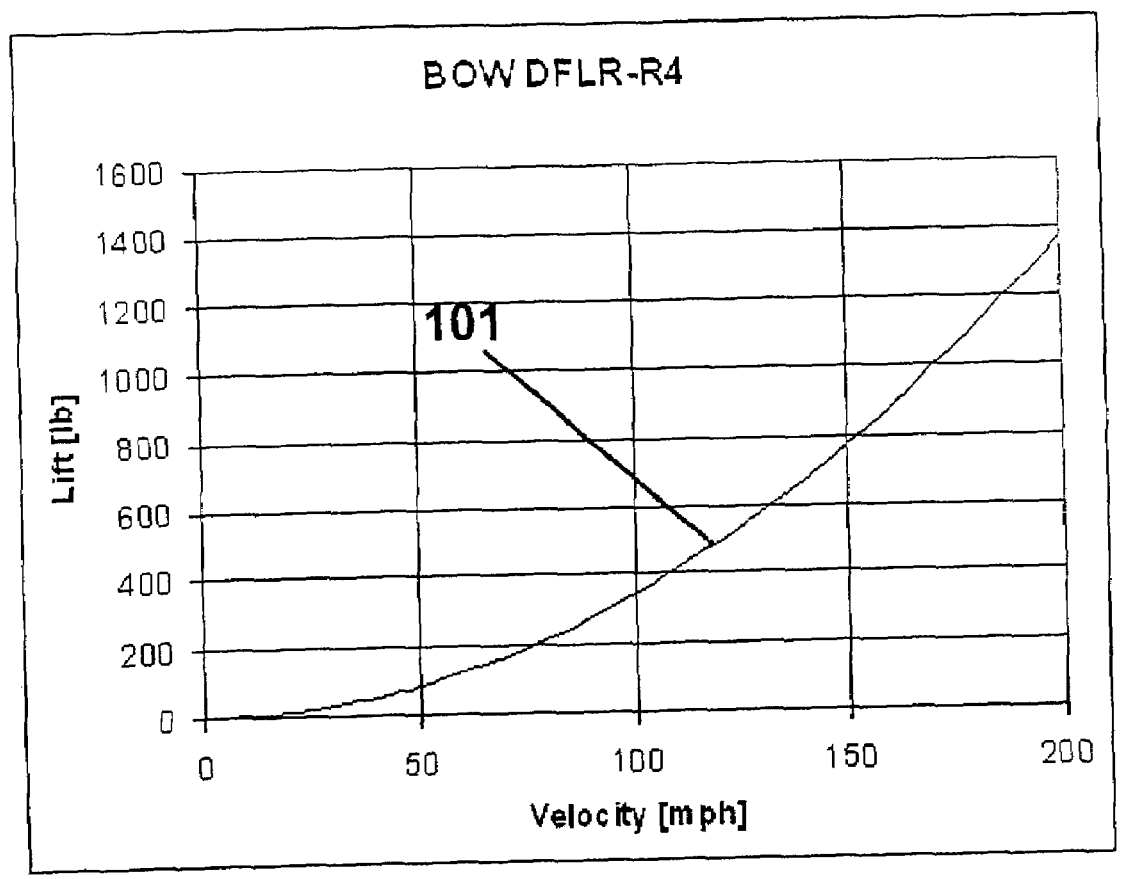
FIG. 11 is an example of the estimated lift generated by two bow wings for a powerboat as a function of velocity in accordance with an example embodiment of the present invention.
Figure 12:
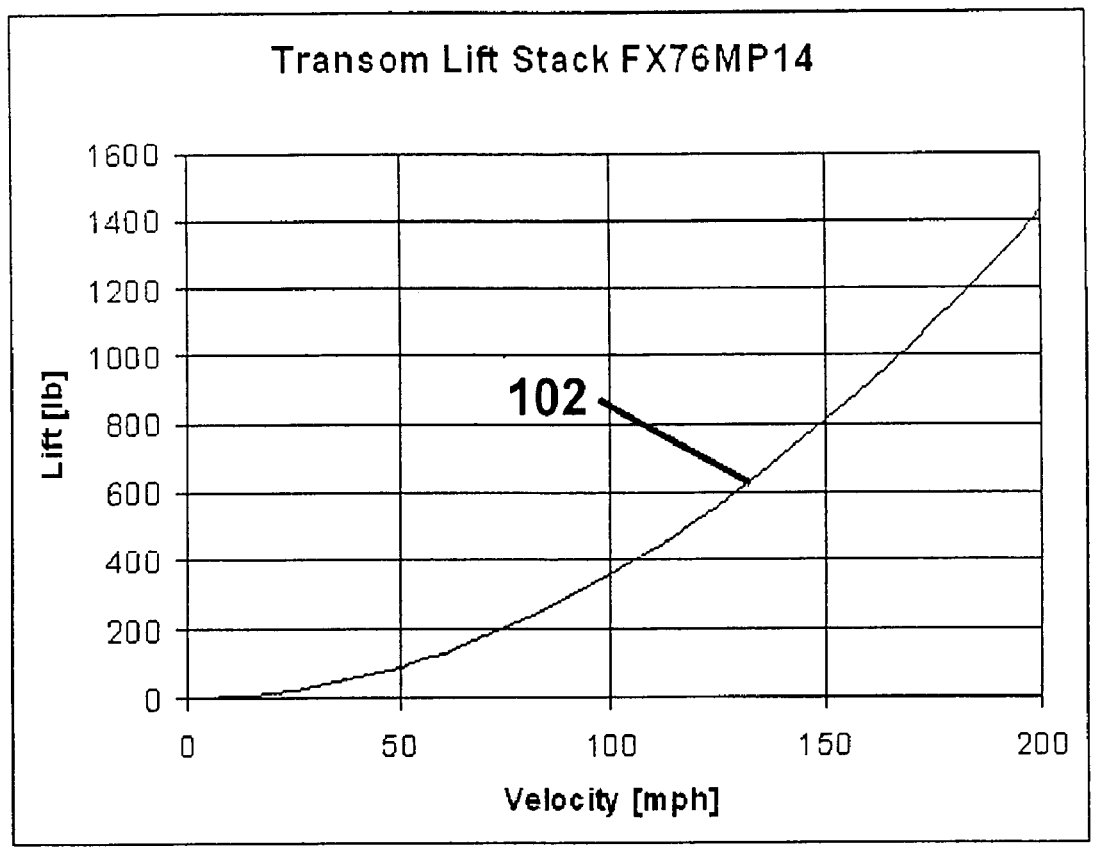
FIG. 12 is an example of the estimated lift generated by two twin airfoil transom (aft) wings for a powerboat as a function of velocity in accordance with an example embodiment of the present invention.
Figure 13:
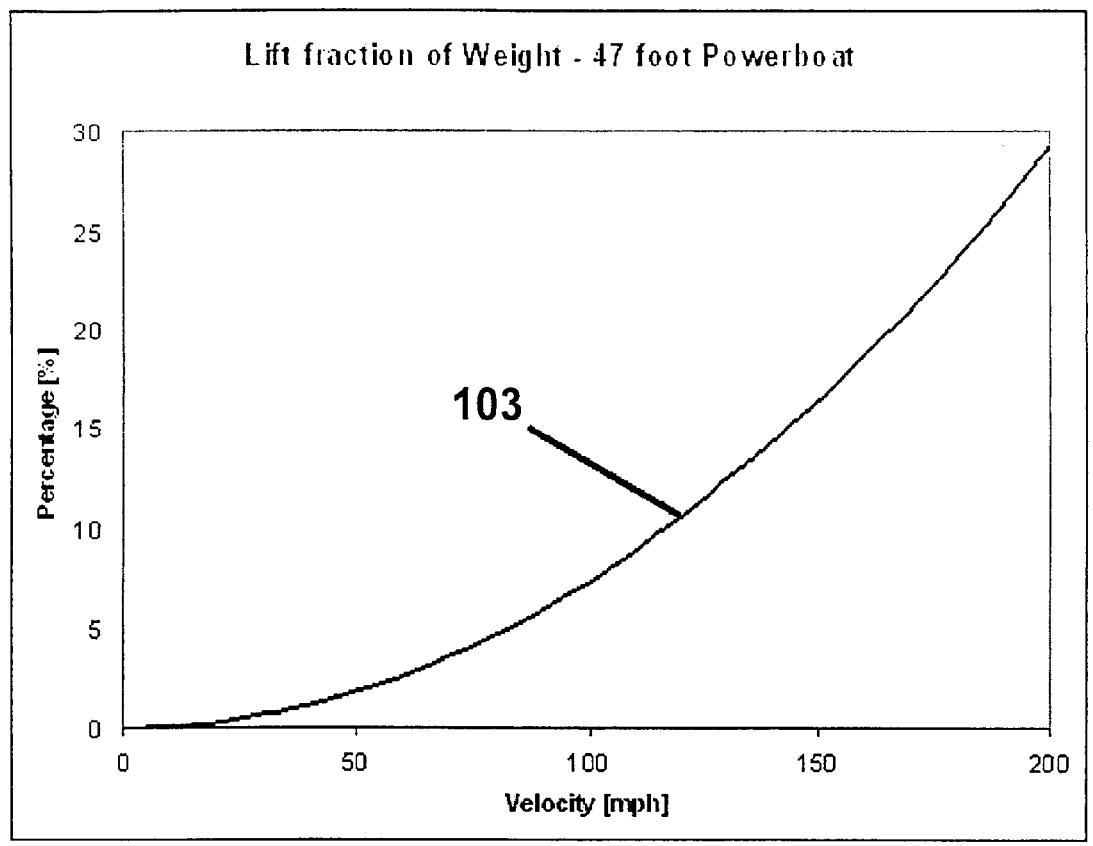
FIG. 13 is an example of the estimated lift generated as a percentage of total boat weight by two bow wings for a powerboat as a function of velocity in accordance with an example embodiment of the present invention.

To demonstrate the advantages of various example embodiments of the present invention, a wing system was designed for a 47 foot, 9800 lbs powerboat, similar to the example embodiment of the power boat 23 shown in FIG. 2. For the bow, a transonic wing profile was selected with an area of 0.6 m$^2$ for both the starboard wing 7 and the port wing 8, each wing having a 6° angle of attack. For the transom a staggered stack of two wings was selected with areas of 0.26 m$^2$ and 0.1 m$^2$, respectively, for the stack of starboard wings 9, 10 and for the stack of port wings 11, 12, each set of wings having angles of attack at 14° and 36°, respectively. The estimated lift generated as a function of boat velocity is shown by curve 101 in FIG. 11 for the bow wings 7, 8 and by curve 102 in FIG. 12 for the transom wings 9, 10, 11, 12. In this particular example, the bow wings have an airfoil profile DLRF-R4 and the transom stacks of wings have an airfoil profile FX76MP14. The particular selection shows that the lift is generated in a virtually pitch-free manner, as can be seen from the matching curves 101, 102 of FIGS. 11 and 12. It is clear that a different selection of wings and wing attitudes can generate lift in a bow-lifting or transom lifting manner. For this particular example, using the above-described wing configuration for the 47 foot powerboat 23 shown in FIG. 2, the lift generated as a percentage of total weight is shown by curve 103 in FIG. 13 as a function of velocity. At velocities of 160 mph, the bow and transom wings provided lift in excess of 20% of the boat weight. With estimates of aerodynamic drag reductions of around 5% from the bow eroded-hull forms and 10% from the transom flow management through downwash, significant gains in top speed and/or cost-effective improvements in fuel efficiency can be realized.

EXAMPLE II

To illustrate the effectiveness of the example embodiment of the present invention utilizing a single leading-edge wing at the leading edge of a tunnel hull of a catamaran, an example wing system in accordance with the present invention was designed for a 40 foot, 8500 lbs catamaran. The particular catamaran used for this example, in its prior-art form, has a tunnel width of 66 inches, a tunnel height at the front of 66 inches and a tunnel height at the back of 44 inches. The benefits of example embodiments of the present invention are illustrated by the effect of a leading-edge wing to decrease the ability of the tunnel-generated forces to lift the hull off the water in addition to decrease the ability of the tunnel-generated forces to rotate the bow up and around the center of inertia ("blow over" event).

Figure 14:
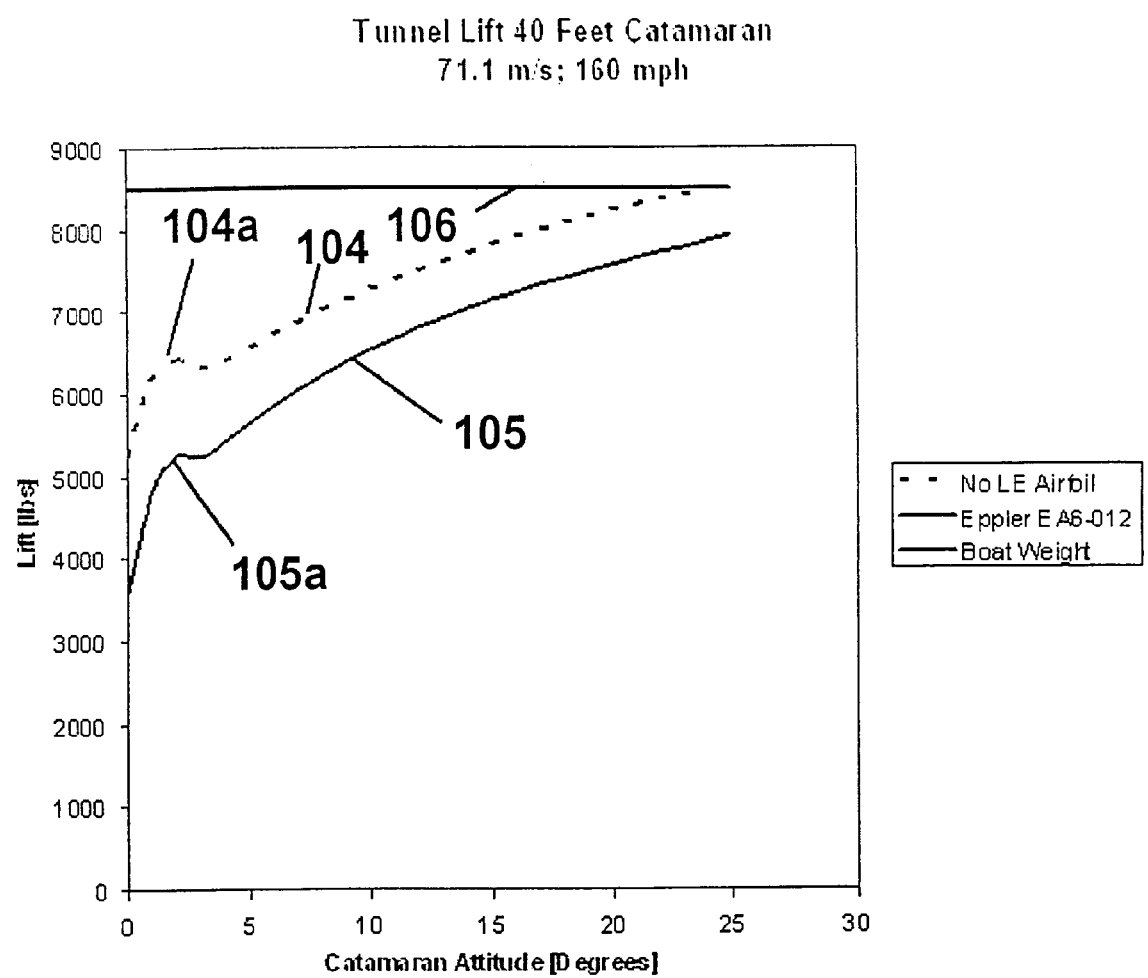
FIG. 14 is an example of the estimated tunnel-generated lift force at 160 mph as a function of catamaran attitude angle for a 40 feet catamaran with and without tunnel leading-edge wing.
Figure 15:
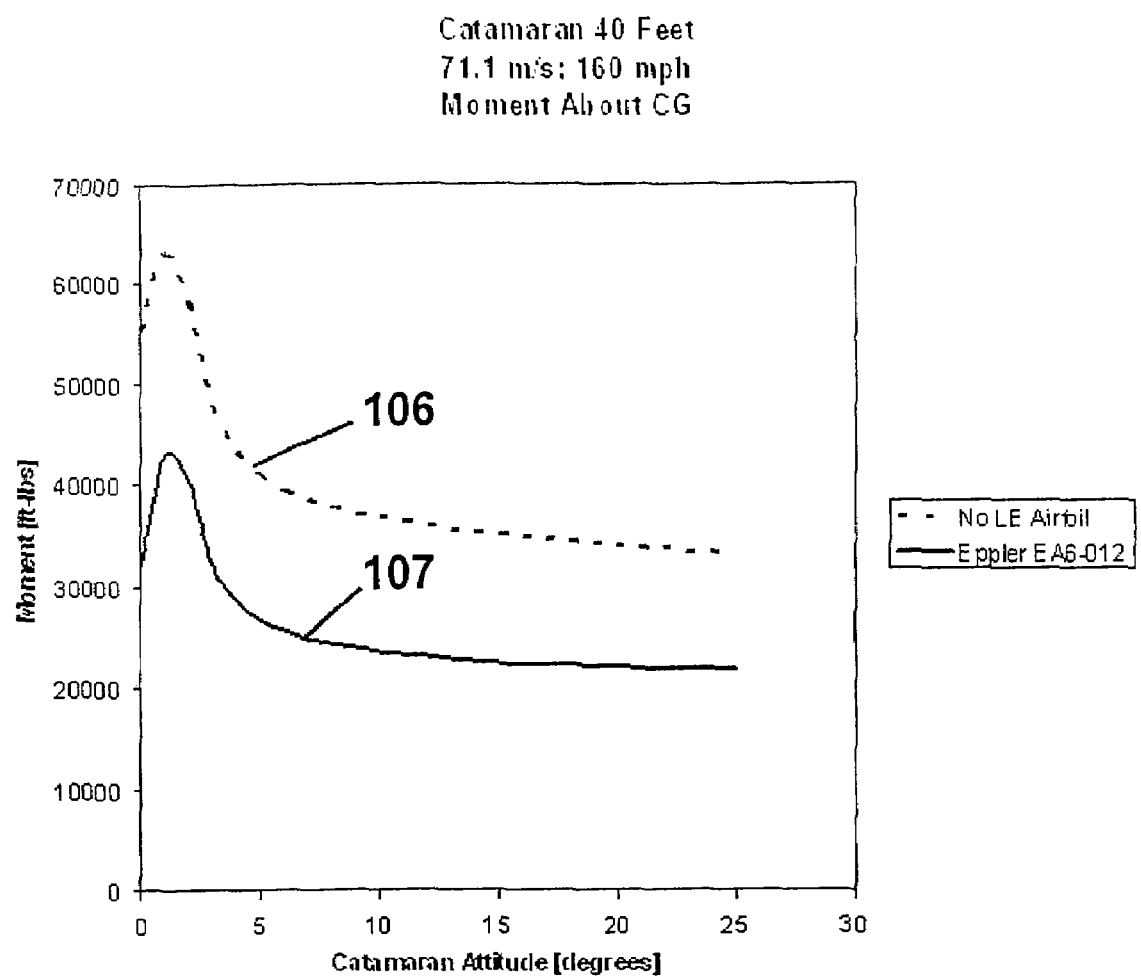
FIG. 15 is an example of the estimated tunnel-generated (bow-lifting) moment about the center of inertia at 160 mph as a function of catamaran attitude angle for a 40 feet catamaran with and without tunnel leading-edge wing.

FIG. 14 shows, as a function of catamaran attitude (the angle of the longitudinal axis of inertia of the boat with respect to the water) at 160 mph, the lift generated by the tunnel alone (curve 104 shown in dashed line) and the lift generated by the tunnel with an airfoil placed at the leading edge of the tunnel (curve 105 shown in solid line). For comparison, the boat weight 106 is shown in FIG. 14. The airfoil used in this example is a symmetric Eppler EA6-012 airfoil with a chord of 75% of the tunnel-inlet height. To illustrate the control abilities of the present disclosure, the airfoil is assumed to maintain a −7° angle with respect to the freestream airflow. This angle of attack generated a downwardly-directed lift with a lift coefficient of 1.0 and a drag coefficient of 0.02 for the conditions described above. The choice for the speed of 160 mph is based on the minimum attainable top speed for this particular hull design with two 1150 hp engines and standard stern drive systems. With and without leading-edge airfoil, FIG. 14 shows a virtually steady increase in lift with increasing catamaran-attitude angles. The "bump" in the curves (shown at 104a and 105a) at small angles is a result of "leakage" of air from the tunnel as the front of the sponsons lift off the water with increasing catamaran-attitude angles. FIG. 14 demonstrates that at a catamaran-attitude of 25° the tunnel-generated lift alone can lift the entire boat off the water (curve 104). FIG. 14 also illustrates how the leading-edge wing shifts the lift characteristics such that under the conditions, a 25° catamaran attitude is still within the safe operating envelope (curve 105); the lift generated with a leading-edge wing is still about 10% away from being able to lift the hull. For clarity the beneficial effects from a rear wing have been disregarded in this example. FIG. 15 shows the moment about the center of inertia generated by aerodynamic tunnel forces without (curve 106, shown in dashed line) and with (curve 107 shown in solid line) such a leading-edge airfoil. FIG. 15 illustrates that the use of a leading-edge airfoil greatly counteracts the tendency of a catamaran hull to initiate a rotation of the bow upwards which may result in a dangerous blow-over event.

Figure 16:
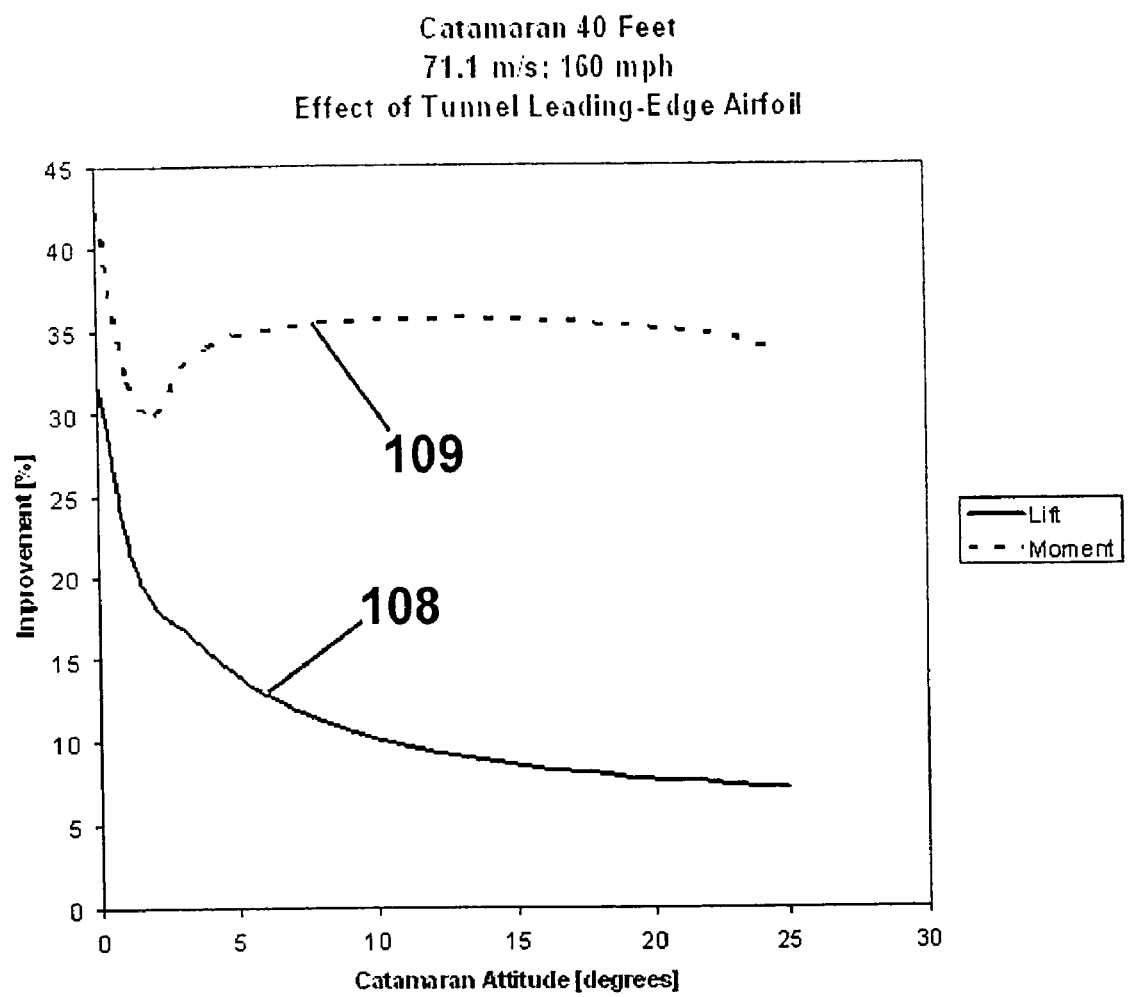
FIG. 16 shows the reduction in tendencies for a 40 feet catamaran at 160 mph to lift off or the blow over.

Thus, a prior-art catamaran (without a leading-edge wing) can generate enough lift for the hull to lift off the water entirely at moderate angles (as shown in FIG. 14) with respect to the water and air free stream, and generates a substantial moment about the center of inertia to increase the angle of attack (as shown in FIG. 15), increasing the lift forces further ultimately leading to potentially dangerous conditions. FIG. 16 illustrates the decreased tendencies of the catamaran to lift off with a leading-edge wing (curve 108 shown in solid line) as compared to the tendencies of the catamaran to blow over (curve 109 shown in dashed line) without such a leading-edge wing. Whereas the prior-art catamaran design can lead to conditions where the high moments resulting in higher lift forces through increased angles with respect to the water and air free stream, the particular leading-edge wing used in this example decreased that tendency by over 30% throughout the attitude-angle range. In particular, the leading-edge wing interferes strongly in the dangerous cycle of high moment, increasing attitude angle, higher lift which is unavoidable in prior-art catamarans running close to maximum attainable speeds. It should be recognized that the boat speed referred to in this disclosure actually refers to speed with respect to the air. When a vessel experiences a 20 mph head wind, the effective aerodynamic speed is increased by a like amount. When turning into such a wind or when a transient head wind appears, a boat running already close to the performance envelope may be suddenly lifted off the water as a result of a sudden increase in aerodynamic lift. A catamaran equipped with a leading-edge wing allows a fast correction of lift characteristics to keep the catamaran pitch angles within the safe envelope. As such, the leading-edge wing can be kept in a lift neutral, low-drag angle under normal running conditions only to be adjusted to correct incipient dangerous pitch conditions. Further, increased attitude control can be achieved by using separate leading edge wings on either side of the tunnel leading edge, such as wings 42 and 43 shown in FIG. 8B. It should be appreciated that that the above-described example is also applicable to multi-hull vessels with more than one tunnel where at least one tunnel uses a leading-edge wing.

While the present invention has been described with particular reference to example embodiments, it should be understood by those of ordinary skill in the art that numerous modifications and adaptations may be made thereto without departing from the spirit and scope of the invention as defined in the appended claims.

What is claimed is:

1. A method for reducing aerodynamic and hydrodynamic drag of a high-speed boat, comprising:
   providing at least one lift-generating front wing proximate a bow section of a high-speed boat, said at least one front wing having a corresponding at least one front air channel in said bow section; and
   providing at least one lift-generating rear wing proximate a transom section of said high-speed boat, said at least one rear wing having a corresponding at least one rear air channel in said transom section;
   at least one of said at least one forward wing and said at least one rear wing being adjustable to generate aerodynamic lift with one of: (1) a neutral; (2) a transom-lifting; (3) a bow- lifting pitching moment about a center of inertia of said boat;

wherein:
said at least one rear air channel comprises at least one elongated depression carved from said transom section; and
the at least one rear wing is positioned within the corresponding at least one rear air channel such that the at least one rear wing does not protrude substantially from a continuous shape of said transom section.

2. A method in accordance with claim 1, further comprising:
at least one lift-generating central wing proximate a central section of said boat.

3. A method in accordance with claim 1, wherein:
said at least one front air channel comprises at least one elongated depression carved from said bow section; and
the at least one front wing is positioned within the corresponding at least one front air channel such that the at least one front wing does not protrude substantially from a continuous shape of said bow section.

4. A method in accordance with claim 3, further comprising:
identifying at least one high-stagnation pressure area in the bow section of said boat;
wherein said at least one front air channel is carved from a bow section corresponding to the at least one high stagnation-pressure area and is positioned substantially parallel with a direction of forward motion of the boat.

5. A method in accordance with claim 1 further comprising:
at least one of positioning and shaping said at least one rear wing to direct downwash from said at least one rear wing to decrease a recirculation zone proximate the transom section such that overall aerodynamic drag of the boat is reduced.

6. A method in accordance with claim 1, wherein:
both of said at least one forward wing and said at least one rear wing are adjustable.

7. A method in accordance with claim 1, wherein:
at least one of said at least one forward wing and said at least one rear wing are automatically adjustable to restore a neutral pitching moment about the center of inertia based on one or more of a sensed orientation, a sensed rotational acceleration about the center of inertia, and a speed of said boat as said boat travels over water.

8. A method in accordance with claim 1, wherein:
said at least one front wing having a corresponding at least one front air channel comprises a starboard front wing having a starboard front air channel and a port front wing having a port front air channel; and
said at least one rear wing having a corresponding at least one rear air channel comprises at least one starboard rear wing having a starboard rear air channel and at least one port rear wing having a port rear air channel.

9. A method in accordance with claim 8, wherein:
said starboard front wing, said port front wing, said at least one starboard rear wing and said at least one port rear wing are one of manually and automatically adjustable to control pitch, trim, roll, heel, and yaw of said boat.

10. A method in accordance with claim 1, wherein support structure and control equipment for said wings are substantially aerodynamically concealed in a profile of a corresponding section of said boat.

11. A method in accordance with claim 1, wherein at least one of said wings is fitted with one of end plates and winglets.

12. A method in accordance with claim 1, wherein at least one of said wings has a leading edge with multiple contours.

13. A method in accordance with claim 1, wherein:
the high speed boat comprises a catamaran;
said at least one front air channel comprises an air tunnel formed between sponsons of the catamaran;
said at least one front wing is positioned proximate a leading edge of the air tunnel;
said at least one front wing is adjustable for controlling said aerodynamic lift.

14. A method in accordance with claim 13, wherein:
said at least one front wing positioned proximate the leading edge of the roof of the tunnel formed between the sponsons of the catamaran comprises a starboard front wing positioned on a starboard side proximate said leading edge and a port front wing positioned on a port side proximate said leading edge.

15. A method in accordance with claim 1, wherein:
the high speed boat comprises a multi-hull boat;
the at least one air front channel comprises one or more air tunnels formed between hull portions;
at least one of said at least one front wing is positioned proximate a leading edge of a roof of at least one of said air tunnels; and
said at least one front wing is adjustable for controlling at least one of said aerodynamic lift and inlet airflow to said tunnel in order to control at least one of tunnel lift and pitch.

16. A method in accordance with claim 1, wherein:
at least a portion of a roof of said front airflow channel is formed by a pressure side of the said at least one forward wing.

17. A method in accordance with claim 1, wherein:
a position and angle of attack of at least one of said wings is actively adjustable via mechanical devices.

18. A method in accordance with claim 1, further comprising:
instantaneously measuring at least one of an absolute attitude, speed, and rotational acceleration of the boat; and
adjusting a position and angle of attack of each of said wings in response to at least one of said measured attitude, speed, and rotational acceleration in order to achieve a desired attitude.

19. A method in accordance with claim 18, wherein:
input for said instantaneous adjustment is obtained via at least one of a gyro, a global positioning system, and an accelerometer.

20. A method for reducing aerodynamic and hydrodynamic drag of a high-speed boat, comprising:
providing at least one lift-generating front wing proximate a bow section of a high-speed boat, said at least one front wing having a corresponding at least one front air channel in said bow section; and
providing at least one lift-generating rear wing proximate a transom section of said high-speed boat, said at least one rear wing having a corresponding at least one rear air channel in said transom section;
at least one of said at least one forward wing and said at least one rear wing being adjustable to generate aerodynamic lift with one of: (1) a neutral; (2) a transom-lifting; (3) a bow- lifting pitching moment about a center of inertia of said boat
wherein:
said at least one front wing having a corresponding at least one front air channel comprises a starboard front wing having a starboard front air channel and a port front wing having a port front air channel;
said at least one rear wing having a corresponding at least one rear air channel comprises at least one starboard rear wing having a starboard rear air channel and at least one port rear wing having a port rear air channel;

said at least one starboard rear wing comprises a first starboard rear wing and a second starboard rear wing, said first starboard rear wing being arranged in front of said second starboard rear wing; and said at least one port rear wing comprises a first port rear wing and a second port rear wing, said first port rear wing being arranged in front of said second port rear wing.

21. A method in accordance with claim 20, wherein:

airflow from a trailing edge of the first starboard rear wing is directed over a suction side of the second starboard rear wing; and airflow from a trailing edge of the first port rear wing is directed over a suction side of the second port rear wing.

22. A method in accordance with claim 21, wherein:

said second port and starboard rear wings have a larger angle of attack with respect to the airflow than an angle of attack of the first port and starboard rear wings.

23. A method in for reducing aerodynamic and hydrodynamic drag of a high-speed boat, comprising:

providing at least one lift-generating front wing proximate a bow section of a high-speed boat, said at least one front wing having a corresponding at least one front air channel in said bow section;

providing at least one lift-generating rear wing proximate a transom section of said high-speed boat, said at least one rear wing having a corresponding at least one rear air channel in said transom section;

providing a port freeboard wing proximate a port side of the transom section, said port freeboard wing having a corresponding port freeboard air channel; and providing a starboard freeboard wing proximate a starboard side of the transom section, said starboard freeboard wing having a corresponding starboard freeboard air channel;

at least one of said at least one forward wing and said at least one rear wing being adjustable to generate aerodynamic lift with one of: (1) a neutral; (2) a transom-lifting; (3) a bow- lifting pitching moment about a center of inertia of said boat.

24. A method in accordance with claim 23 wherein:

said air channels comprise passageways for airflow under the wings; and a profile of the wings is substantially maintained within a profile of a corresponding section of said boat.

25. A method in accordance with claim 23, further comprising:

at least one of positioning and shaping said port freeboard wing and said starboard freeboard wing to direct downwash therefrom to decrease a recirculation zone proximate the transom section such that overall aerodynamic drag of the boat is reduced.

26. A method in accordance with claim 23, wherein:

said port freeboard wing and said starboard freeboard wing are independently adjustable for one of pulling the bow to port side, pulling the bow to starboard, and assisting in aligning the boat in the direction of travel.

27. A method for reducing aerodynamic and hydrodynamic drag of a catamaran, comprising:

providing at least one lift-generating front wing positioned proximate a leading edge of an air tunnel formed between sponsons of the catamaran in a bow section of the catamaran; and providing at least one lift-generating rear wing proximate a transom section of said catamaran, said at least one rear wing having a corresponding at least one rear air channel in said transom section;

at least one of said at least one forward wing and said at least one rear wing being adjustable to control aerodynamic lift with one of: (1) a neutral; (2) a transom-lifting; (3) a bow-lifting pitching moment about a center of inertia of said catamaran; and said at least one front wing being further adjustable for controlling inlet airflow to said tunnel in order to control at least one of tunnel lift and pitch.

28. A method for reducing aerodynamic and hydrodynamic drag of a high-speed boat, comprising:

providing at least one lift-generating front wing proximate a bow section of a high-speed boat, said at least one front wing having a corresponding at least one front air channel in said bow section; and providing at least one lift-generating rear wing proximate a transom section of said high-speed boat, said at least one rear wing having a corresponding at least one rear air channel in said transom section;

at least one of said at least one forward wing and said at least one rear wing being adjustable to generate aerodynamic lift with one of: (1) a neutral; (2) a transom-lifting; (3) a bow-lifting pitching moment about a center of inertia of said boat; and at least one of said wings comprising multiple airfoils arranged in series such that airflow leaving a pressure side of an upstream airfoil energizes a boundary layer of a suction side of a downstream airfoil directly adjacent said upstream airfoil.

29. A method in accordance with claim 28, wherein:

said at least one rear air channel comprises at least one elongated depression carved from said transom section; and the at least one rear wing is positioned within the corresponding at least one rear air channel such that the at least one rear wing does not protrude substantially from a continuous shape of said transom section.

30. Apparatus for reducing aerodynamic and hydrodynamic drag of a high-speed boat, comprising:

at least one lift-generating front wing proximate a bow section of a high-speed boat, said at least one front wing having a corresponding at least one front air channel in said bow section;

at least one lift-generating rear wing proximate a transom section of said high-speed boat, said at least one rear wing having a corresponding at least one rear air channel in said transom section; and adjustment means for adjusting at least one of said at least one forward wing and said at least one rear wing to generate aerodynamic lift with one of: (1) a neutral; (2) a transom-lifting; and (3)a bow-lifting pitching moment about a center of inertia of said boat;

wherein:

said at least one rear air channel comprises at least one elongated depression carved from said transom section; and the at least one rear wing is positioned within the corresponding at least one rear air channel such that the at least one rear wing does not protrude substantially from a continuous shape of said transom section.

* * * * *